US011070846B2

(12) United States Patent
Rassool

(10) Patent No.: US 11,070,846 B2
(45) Date of Patent: Jul. 20, 2021

(54) MULTI-LAYERED VIDEO STREAMING SYSTEMS AND METHODS

(71) Applicant: REALNETWORKS, INC., Seattle, WA (US)

(72) Inventor: Reza Rassool, Seattle, WA (US)

(73) Assignee: REALNETWORKS, INC., Seattle, WA (US)

( * ) Notice: Subject to any disclaimer, the term of this patent is extended or adjusted under 35 U.S.C. 154(b) by 5 days.

(21) Appl. No.: 16/609,703

(22) PCT Filed: May 1, 2018

(86) PCT No.: PCT/US2018/030403
§ 371 (c)(1),
(2) Date: Oct. 30, 2019

(87) PCT Pub. No.: WO2018/204330
PCT Pub. Date: Nov. 8, 2018

(65) Prior Publication Data
US 2020/0120360 A1    Apr. 16, 2020

Related U.S. Application Data

(60) Provisional application No. 62/492,858, filed on May 1, 2017.

(51) Int. Cl.
*H04N 19/70*    (2014.01)
*H04N 21/2343*    (2011.01)
(Continued)

(52) U.S. Cl.
CPC .............. *H04N 19/70* (2014.11); *H04N 19/30* (2014.11); *H04N 19/597* (2014.11);
(Continued)

(58) Field of Classification Search
CPC ...... H04N 19/70; H04N 19/30; H04N 19/597; H04N 21/234327; H04N 21/234363; H04N 21/816; H04N 21/234345
See application file for complete search history.

(56) References Cited

U.S. PATENT DOCUMENTS

| 2014/0003504 | A1 | 1/2014 | Ugur et al. | |
| 2015/0326896 | A1* | 11/2015 | Su | H04N 21/234327 375/240.26 |
| 2017/0118540 | A1* | 4/2017 | Thomas | H04N 19/167 |

FOREIGN PATENT DOCUMENTS

| WO | 2016/113458 A1 | 7/2016 | |
| WO | WO-2017060423 A1 * | 4/2017 | ........... H04N 19/187 |

* cited by examiner

*Primary Examiner* — Sath V Perungavoor
*Assistant Examiner* — Tyler B Edwards
(74) *Attorney, Agent, or Firm* — Seed IP Law Group LLP

(57) ABSTRACT

Systems and methods for enabling a video capture/encoding device to capture frames of a video sequence; obtain feedback from a video decoding/rendering device; divide each frame into an array of patches; select one or more patches of each frame for supplemental processing; cause the frames of the video sequence to be encoded by a video encoding module and cause the selected patches to be processed by one or more supplemental processing module(s); and assemble a multi-layer video transport stream wherein, for each frame of the video sequence, a base layer of the transport stream includes data corresponding to an encoded version of the current frame and one or more supplemental layers of the transport stream include meta-data corresponding to the division of the current frame into patches and data corresponding to the output of the supplemental processing of the selected patches of the current frame.

21 Claims, 24 Drawing Sheets

(51) Int. Cl.
*H04N 19/30* (2014.01)
*H04N 21/81* (2011.01)
*H04N 19/597* (2014.01)

(52) U.S. Cl.
CPC ............... *H04N 21/234327* (2013.01); *H04N 21/234363* (2013.01); *H04N 21/816* (2013.01)

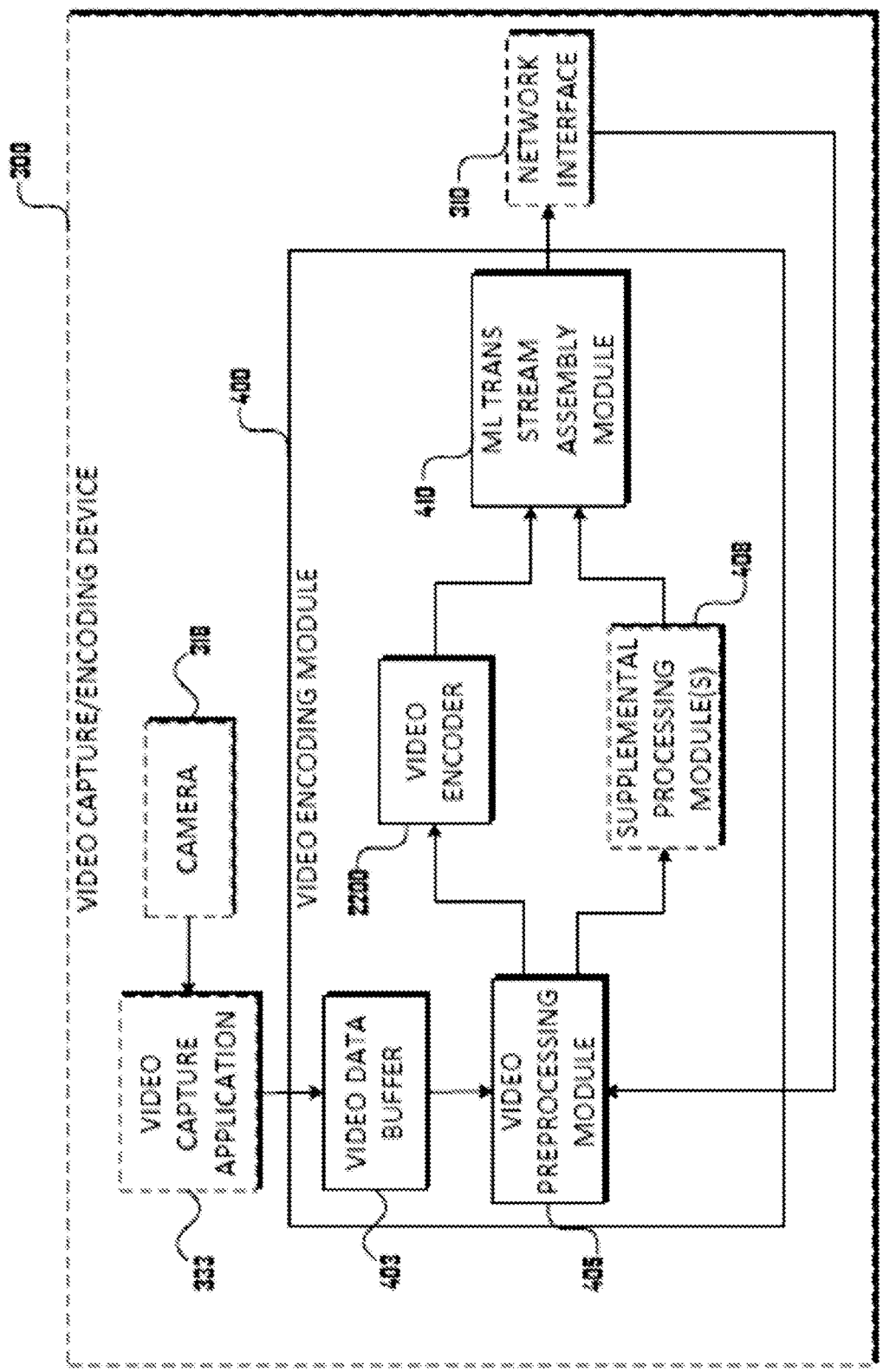

Fig. 5A

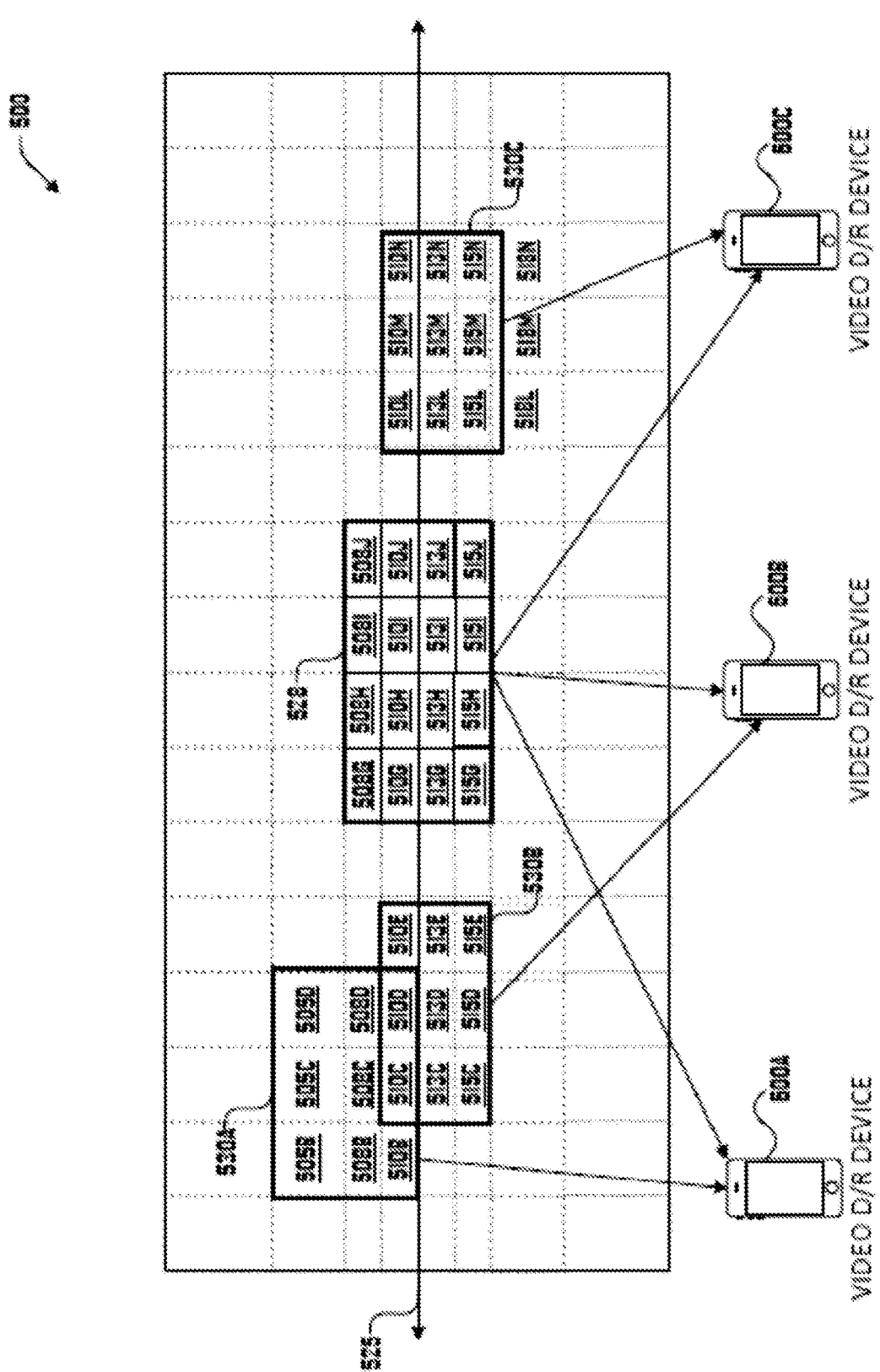

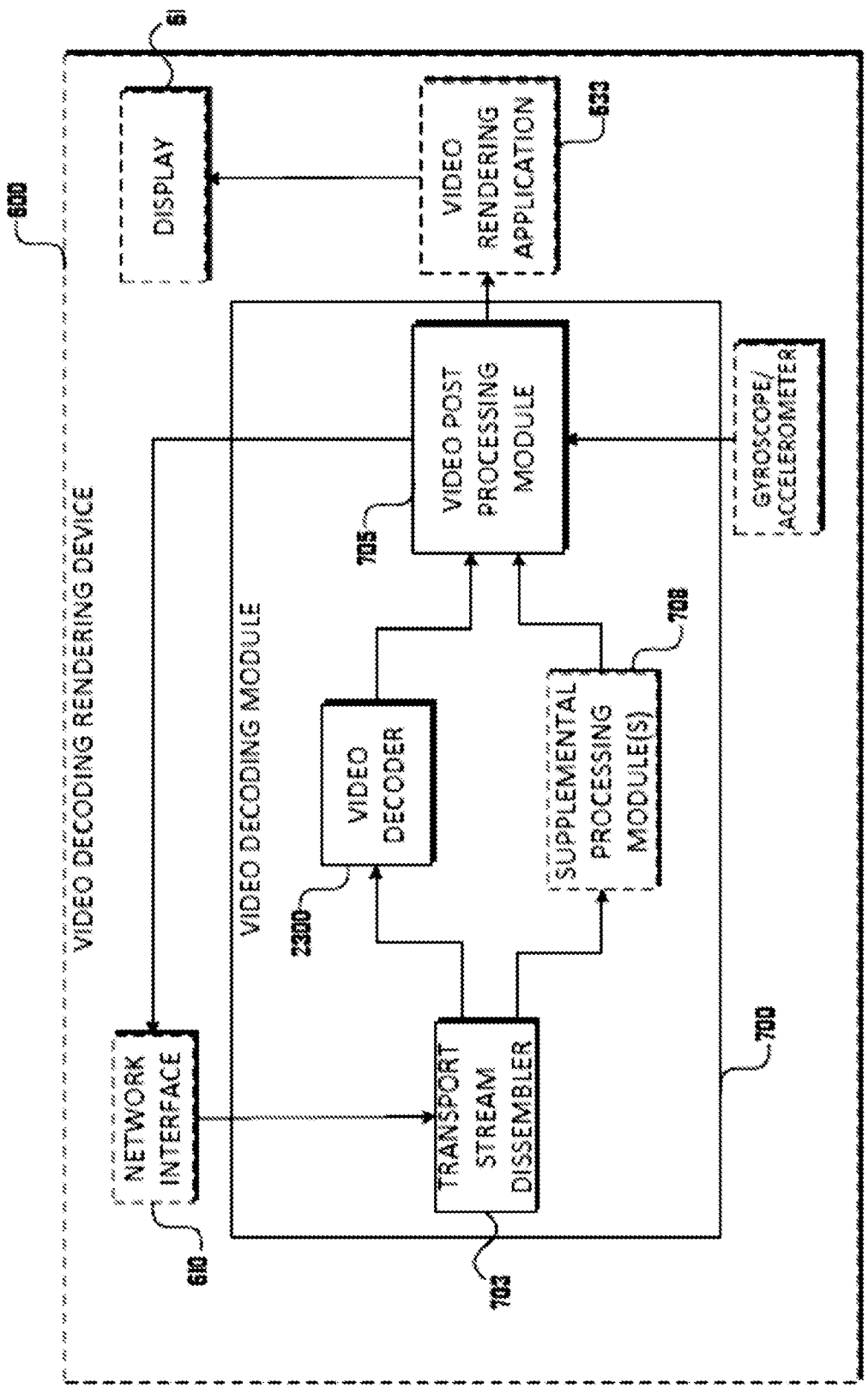

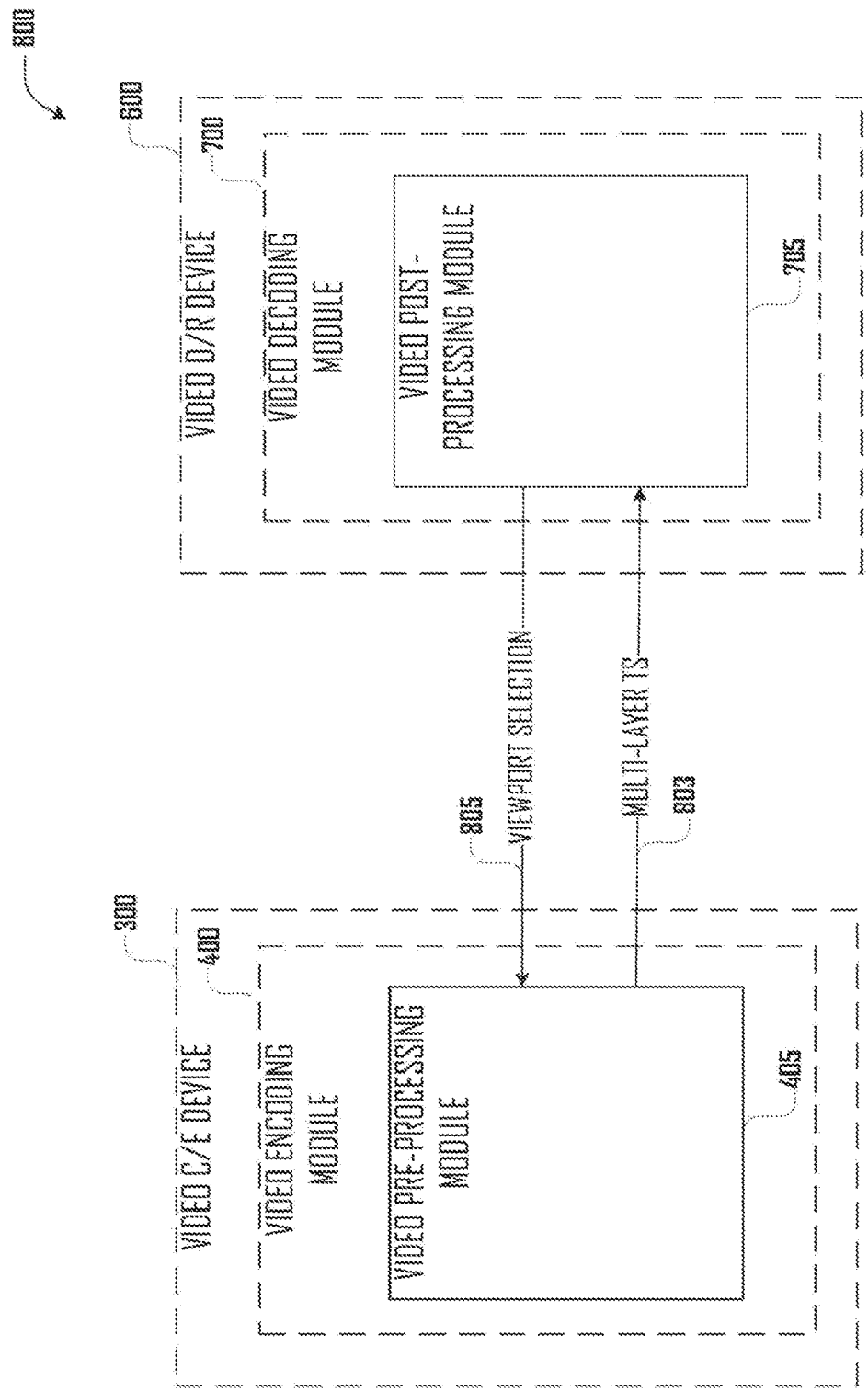

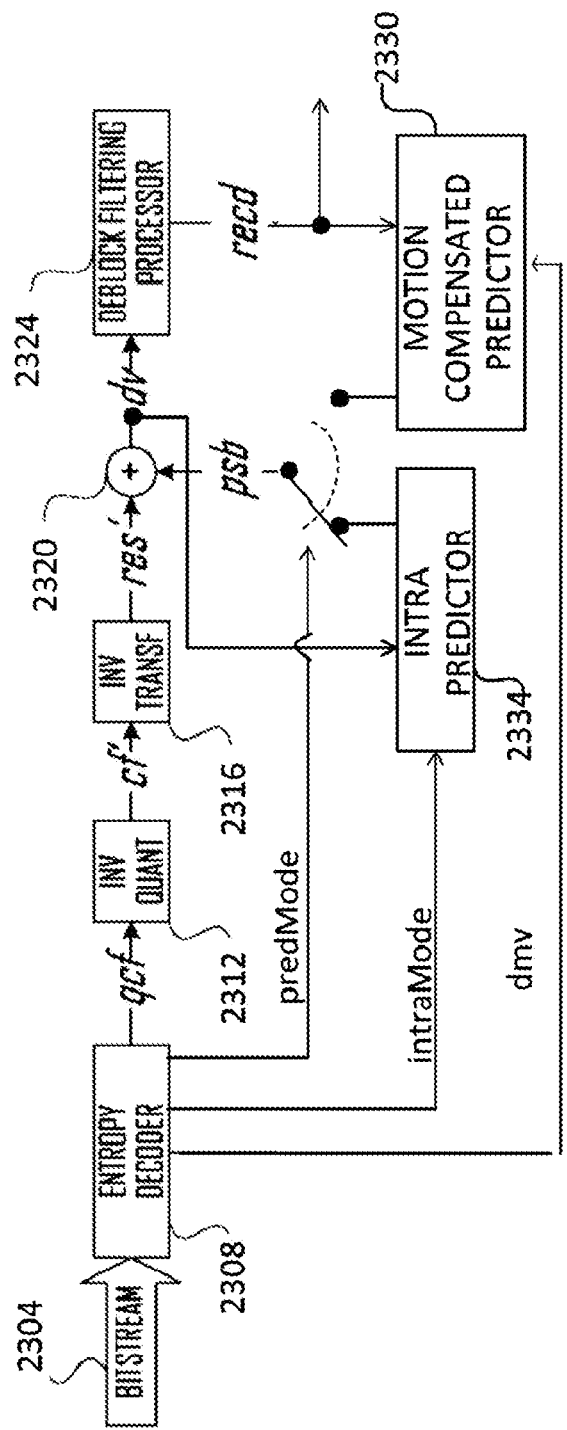

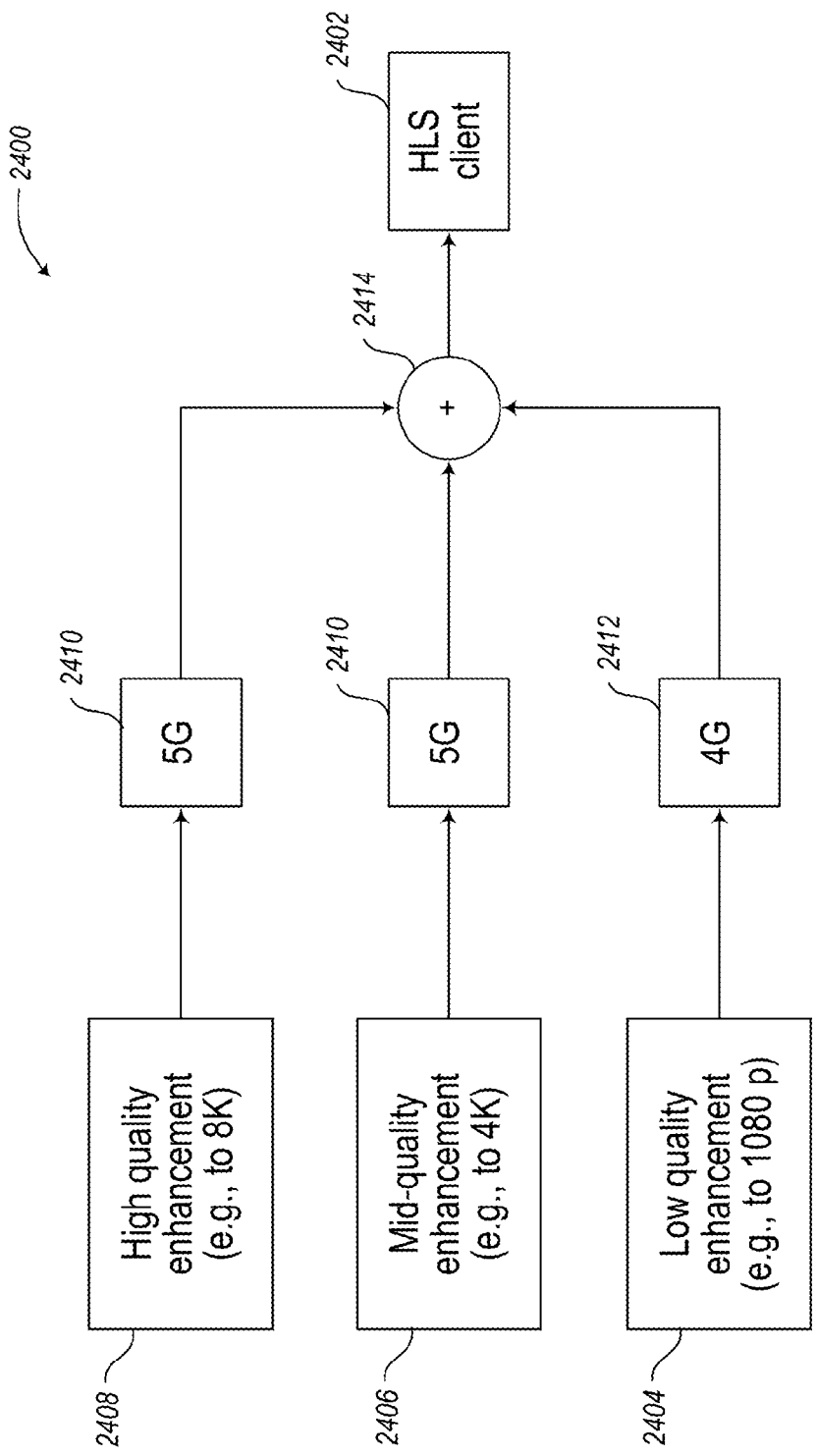

MULTI-LAYERED VIDEO STREAMING SYSTEMS AND METHODS

BACKGROUND

Technical Field

The present disclosure relates to video encoding and decoding and more particularly, to systems and methods for capturing and encoding wide-frame/panoramic video sequences and decoding and rendering viewports within the wide-frame/panoramic video sequences.

Description of the Related Art

The advent of digital multimedia such as digital images, speech/audio, graphics, and video have significantly improved various applications as well as opened up brand new applications due to relative ease by which it has enabled reliable storage, communication, transmission, and, search and access of content. Overall, the applications of digital multimedia have been many, encompassing a wide spectrum including entertainment, information, medicine, and security, and have benefited the society in numerous ways. Multimedia as captured by sensors such as cameras and microphones is often analog, and the process of digitization in the form of Pulse Coded Modulation (PCM) renders it digital. However, just after digitization, the amount of resulting data can be quite significant as is necessary to re-create the analog representation needed by speakers and/ or TV display. Thus, efficient communication, storage or transmission of the large volume of digital multimedia content requires its compression from raw PCM form to a compressed representation. Thus, many techniques for compression of multimedia have been invented. Over the years, video compression techniques have grown very sophisticated to the point that they can often achieve high compression factors between 10 and 100 while retaining high psycho-visual quality, often similar to uncompressed digital video.

While progress has been made to date in the art and science of video compression (as exhibited by the plethora of standards bodies driven video coding formats such as MPEG-1, MPEG-2, H.263, MPEG-4 part2, MPEG-4 AVC/H.264, MPEG-4 SVC and MVC, as well as industry driven proprietary standards such as Windows Media Video, RealVideo, On2 VP, and the like), the ever increasing appetite of consumers for even higher quality, higher definition, and now 3D (stereo) video, available for access whenever, wherever, has necessitated delivery via various means such as DVD/BD, over the air broadcast, cable/satellite, wired and mobile networks, to a range of client devices such as PCs/laptops, TVs, set top boxes, gaming consoles, portable media players/devices, smartphones, and wearable computing devices, fueling the desire for even higher levels of video compression.

All aforementioned standards employ a general intra/interframe predictive coding framework in order to reduce spatial and temporal redundancy in the encoded bit-stream. The basic concept of interframe prediction is to remove the temporal dependencies between neighboring pictures by using block matching method. At the outset of an encoding process, each frame of the unencoded video sequence is grouped into one of three categories: I-type frames, P-type frames, and B-type frames. I-type frames are intra-coded. That is, only information from the frame itself is used to encode the picture and no inter-frame motion compensation techniques are used (although intra-frame motion compensation techniques may be applied).

The other two types of frames, P-type and B-type, are encoded using inter-frame motion compensation techniques. The difference between P-picture and B-picture is the temporal direction of the reference pictures used for motion compensation. P-type pictures utilize information from previous pictures in display order, whereas B-type pictures may utilize information from both previous and future pictures in display order.

For P-type and B-type frames, each frame is divided into blocks of pixels, represented by coefficients of each pixel's luma and chrominance components, and one or more motion vectors are obtained for each block (because B-type pictures may utilize information from both a future and a past coded frame, two motion vectors may be encoded for each block). A motion vector (MV) represents the spatial displacement from the position of the current block to the position of a similar block in another, previously encoded frame (which may be a past or future frame in display order), respectively referred to as a reference block and a reference frame. The difference between the reference block and the current block is calculated to generate a residual (also referred to as a "residual signal"). Therefore, for each block of an inter-coded frame, only the residuals and motion vectors need to be encoded rather than the entire contents of the block. By removing this kind of temporal redundancy between frames of a video sequence, the video sequence can be compressed.

To further compress the video data, after inter or intra frame prediction techniques have been applied, the coefficients of the residual signal are often transformed from the spatial domain to the frequency domain (e.g. using a discrete cosine transform ("DCT") or a discrete sine transform ("DST")). For naturally occurring images, such as the type of images that typically make up human perceptible video sequences, low-frequency energy is always stronger than high-frequency energy. Residual signals in the frequency domain therefore get better energy compaction than they would in spatial domain. After forward transform, the coefficients and motion vectors may be quantized and entropy encoded.

On the decoder side, inversed quantization and inversed transforms are applied to recover the spatial residual signal. A reverse prediction process may then be performed in order to generate a recreated version of the original unencoded video sequence.

An encoder may generate a bit-stream corresponding to a complete frame that includes a picture header, followed by a first coding block header for the first coding block of the frame, followed by a first residual data block corresponding to the image data for the first coding block of the frame, followed by a second coding block header for the second coding block, followed by a second residual data block corresponding to the image data for the second coding block, followed by a third coding block header for the third coding block, followed by a third residual data block corresponding to the image data for the third coding block, etc.

The picture header may contain information relevant to a downstream decoder for decoding the complete frame. Similarly, each coding block header may contain the information relevant to a downstream decoder for decoding the upcoming coding block. For example, a coding block header may include code words relating to the coding block's split flag, encoding mode/coding block type, prediction information, motion information, and the like.

As the resolution of motion prediction increases, the amount of bandwidth required to encode and transmit motion vectors increases, both per frame and accordingly across entire video sequences.

BRIEF SUMMARY

A method of encoding a video frame of a sequence of video frames to generate a multi-layer transport stream representative of the video frame, the video frame including an array of pixels and the multi-layer transport stream representative of the video frame, may be summarized as including dividing the video frame along a plurality of horizontal and vertical axes, thereby defining a plurality of patches; selecting one or more of the plurality of patches for supplemental processing; generating encoded frame data corresponding to the video frame, the encoded frame data being generated at a first resolution; generating encoded patch data corresponding to the selected one or more of the plurality of patches, the encoded patch data being generated at a second resolution that is higher than the first resolution; generating a base layer of the multi-layer transport stream, the base layer including the encoded frame data; and generating a supplemental layer of the multi-layer transport stream, the supplemental layer including the encoded patch data.

The method may further include providing the multi-layer transport stream to a video rendering device over a communications network.

The method may further include receiving feedback data from a video rendering device over a communications network, the feedback data corresponding to a spatial portion of the video frame, wherein selecting one or more of the plurality of patches for supplemental processing comprises selecting one or more of the plurality of patches for supplemental processing based at least in part on the received feedback data from the video rendering device. Receiving feedback data from a video rendering device may include receiving dynamic feedback data from the video rendering device during rendering of the sequence of video frames by the video rendering device. Receiving feedback data from a video rendering device may include receiving feedback data generated by the video rendering device responsive to movement of the video rendering device by a user thereof. Receiving feedback data from a video rendering device may include receiving feedback data generated by the video rendering device responsive to user interaction with a user interface operatively coupled to the video rendering device.

The method may further include detecting one or more objects in the video frame, wherein selecting one or more of the plurality of patches for supplemental processing comprises selecting one or more of the plurality of patches for supplemental processing based at least in part on spatial location of the detected one or more objects. Detecting one or more objects in the video frame may include applying a facial recognition technique to determine whether one or more facial structures may be captured in the video frame. Selecting one or more of the plurality of patches for supplemental processing may include initially selecting one or more of the plurality of patches as default patches for supplemental processing.

A video encoder device operative to encode a video frame of a sequence of video frames to generate a multi-layer transport stream representative of the video frame, the video frame including an array of pixels and the multi-layer transport stream representative of the video frame, may be summarized as including at least one nontransitory processor-readable storage medium that stores the sequence of video frames and at least one of instructions or data; and control circuitry operatively coupled to the at least one nontransitory processor-readable storage medium, in operation, the control circuitry: divides the video frame along a plurality of horizontal and vertical axes, thereby defining a plurality of patches; selects one or more of the plurality of patches for supplemental processing; generates encoded frame data corresponding to the video frame, the encoded frame data being generated at a first resolution; generates encoded patch data corresponding to selected one or more of the plurality of patches, the encoded patch data being generated at a second resolution that is higher than the first resolution; generates a base layer of the multi-layer transport stream, the base layer including the encoded frame data; and generates a supplemental layer of the multi-layer transport stream, the supplemental layer including the encoded patch data.

In operation, the control circuitry may provide the multi-layer transport stream to a video rendering device over a communications network. In operation, the control circuitry may receive feedback data from a video rendering device over a communications network, the feedback data corresponding to a spatial portion of the video frame; and select one or more of the plurality of patches for supplemental processing based at least in part on the received feedback data from the video rendering device. In operation, the control circuitry may receive dynamic feedback data from the video rendering device during rendering of the sequence of video frames by the video rendering device. The received feedback data may be generated by a video rendering device responsive to movement of the video rendering device by a user thereof. In operation, the control circuitry may detect one or more objects in the video frame; and select one or more of the plurality of patches for supplemental processing based at least in part on spatial location of the detected one or more objects. In operation, the control circuitry may apply a facial recognition technique to determine whether one or more facial structures may be captured in the video frame.

A method of operating a video rendering device to decode and render a multi-layer transport stream representative of a sequence of video frames may be summarized as including receiving the multi-layer transport stream from a video source device, the multi-layer transport stream comprising a based layer and a supplemental layer, the base layer including encoded frame data corresponding to the sequence of frames, the base layer generated at a first resolution, and the supplemental layer including encoded patch data corresponding to one or more spatial patches of the sequence of frames, the supplemental layer generated at a second resolution that is higher than the first resolution; rendering an initial viewport using the data from the supplemental layer; receiving an indication of a desire to change the viewport from the initial viewport to a new viewport; rendering the new viewport using data from the base layer; providing feedback data to the video source device indicating the new viewport; determining that the supplemental layer data of the multi-layer transport stream corresponds to the new viewport; and rendering the new viewport using data from the supplemental layer. Receiving an indication of a desire to change the viewport may include receiving data indicative of movement of the video rendering device by a user thereof.

A video rendering device operative to decode and render a multi-layer transport stream representative of a sequence of video frames may be summarized as including at least one nontransitory processor-readable storage medium that stores at least one of instructions or data; and control circuitry operatively coupled to the at least one nontransitory processor-readable storage medium, in operation, the control circuitry: receives the multi-layer transport stream from a video source device, the multi-layer transport stream comprising a based layer and a supplemental layer, the base layer including encoded frame data corresponding to the sequence of frames, the base layer generated at a first resolution, and the supplemental layer including encoded patch data corresponding to one or more spatial patches of the sequence of frames, the supplemental layer generated at a second resolution that is higher than the first resolution; renders an initial viewport using the data from the supplemental layer; receives an indication of a desire to change the viewport from the initial viewport to a new viewport; renders the new viewport using data from the base layer; provides feedback data to the video source device indicating the new viewport; determines that the supplemental layer data of the multi-layer transport stream corresponds to the new viewport; and renders the new viewport using data from the supplemental layer. The control circuitry may receive data indicative of movement of the video rendering device by a user thereof, and may provide the feedback data to the video source device based on the received data indicative of movement of the video rendering device.

A method of providing and rendering video content may be summarized as including generating, by a video source device, encoded frame data corresponding to a video frame, the encoded video data being generated at a first resolution; generating, by the video source device, encoded patch data corresponding to an initial viewport of the video frame, the encoded patch data being generated at a second resolution that is higher than the first resolution; generating, by the video source device, a base layer of a multi-layer transport stream, the base layer including the encoded frame data; and generating, by the video source device, a supplemental layer of the multi-layer transport stream, the supplemental layer including the encoded patch data; providing, by the video source device, the multi-layer transport stream to a video rendering device over a communications network; rendering, by the video rendering device, the initial viewport using the received data from the supplemental layer of the multi-layer transport stream; receiving, by the video rendering device, an indication of a desire to change the viewport from the initial viewport to a new viewport; rendering, by the video rendering device, the new viewport using data from the base layer; providing, by the video rendering device, feedback data to the video source device indicating the new viewport; responsive to receiving the feedback data, generating, by the video source device, encoded patch data corresponding to the new viewport of the video frame; determining, by the video rendering device, that the supplemental layer data of the multi-layer transport stream corresponds to the new viewport; and rendering, by the video rendering device, the new viewport using data from the supplemental layer.

The method may further include iteratively during streaming of the multi-layer transport stream: rendering, by the video rendering device, a current viewport using the received data from the supplemental layer of the multi-layer transport stream; receiving, by the video rendering device, an indication of a desire to change the viewport from the current viewport to a new viewport; rendering, by the video rendering device, the new viewport using data from the base layer; providing, by the video rendering device, feedback data to the video source device indicating the new viewport; responsive to receiving the feedback data, generating, by the video source device, encoded patch data corresponding to the new viewport of the video frame; determining, by the video rendering device, that the supplemental layer data of the multi-layer transport stream corresponds to the new viewport; and rendering, by the video rendering device, the new viewport using data from the supplemental layer.

A method of encoding a video to generate a scalable video transport stream may be summarized as including partitioning the video into a plurality of layers, the plurality of layers comprising at least a base layer and a first enhancement layer; generating encoded base frame data corresponding to the base layer of the video, the encoded base frame data comprises a representation of the video at a first quality level; generating encoded first enhancement layer data corresponding to the first enhancement layer of the video, the encoded first enhancement layer data combinable with the encoded base layer data to provide a representation of the video at a second quality level that is higher than the first quality level; receiving connection quality data; and responsive to the received connection quality data: providing a video transport stream that comprises the base layer to a video client device; or providing a video transport stream that comprises both the base layer and the first enhancement layer to a video client device. Receiving connection quality data may include receiving connection quality data from the video client device over a communications network. The first quality level and the second quality level may be quality metrics associated with at least one of temporal resolution, spatial resolution, or signal-to-noise ratio.

Partitioning the video into a plurality of layers may include partitioning the video into at least a base layer, a first enhancement layer, and a second enhancement layer, and may further include generating encoded second enhancement layer data corresponding to the second enhancement layer of the video, the encoded second enhancement layer data combinable with the encoded first enhancement layer data and the encoded base layer data to provide a representation of the video at a third quality level that is higher than the second quality level; and responsive to the received connection quality data: providing a video transport stream that comprises the base layer to a video client device; or providing a video transport stream that comprises both the base layer and the first enhancement layer to a video client device; or providing a video transport stream that comprises the base layer, the first enhancement layer, and the second enhancement layer to a video client device. Receiving connection quality data may include receiving an indication of a network technology currently used by the client device. Receiving connection quality data may include receiving an indication of whether the client device is connected to a fourth generation wireless system (4G) or a fifth generation wireless system (5G). Receiving connection quality data may include dynamically receiving connection quality data during streaming of the video to the client device. Receiving connection quality data may include receiving an indication of a network transmission rate currently available the client device.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 4 illustrates a block diagram of an exemplary video encoding module suitable for use with the exemplary encoding device of FIG. 3.

FIGS. 5A-B illustrate conceptual views of a video frame sub-divided into a plurality of patches in accordance with at least one embodiment.

FIG. 7 illustrates a block diagram of an exemplary video decoding module suitable for use with the exemplary vide decoding device of FIG. 6.

FIG. 8 illustrates block diagram of an exemplary feedback system in accordance with at least one embodiment.

FIG. 22 illustrates a block diagram of an exemplary video encoder in accordance with at least one embodiment.

FIG. 23 illustrates a block diagram of an exemplary video decoder in accordance with at least one embodiment.

FIG. 24 illustrates a schematic diagram of a method of providing a scalable video transport stream to client devices dependent on network connectivity quality.

DETAILED DESCRIPTION

Figure 1:
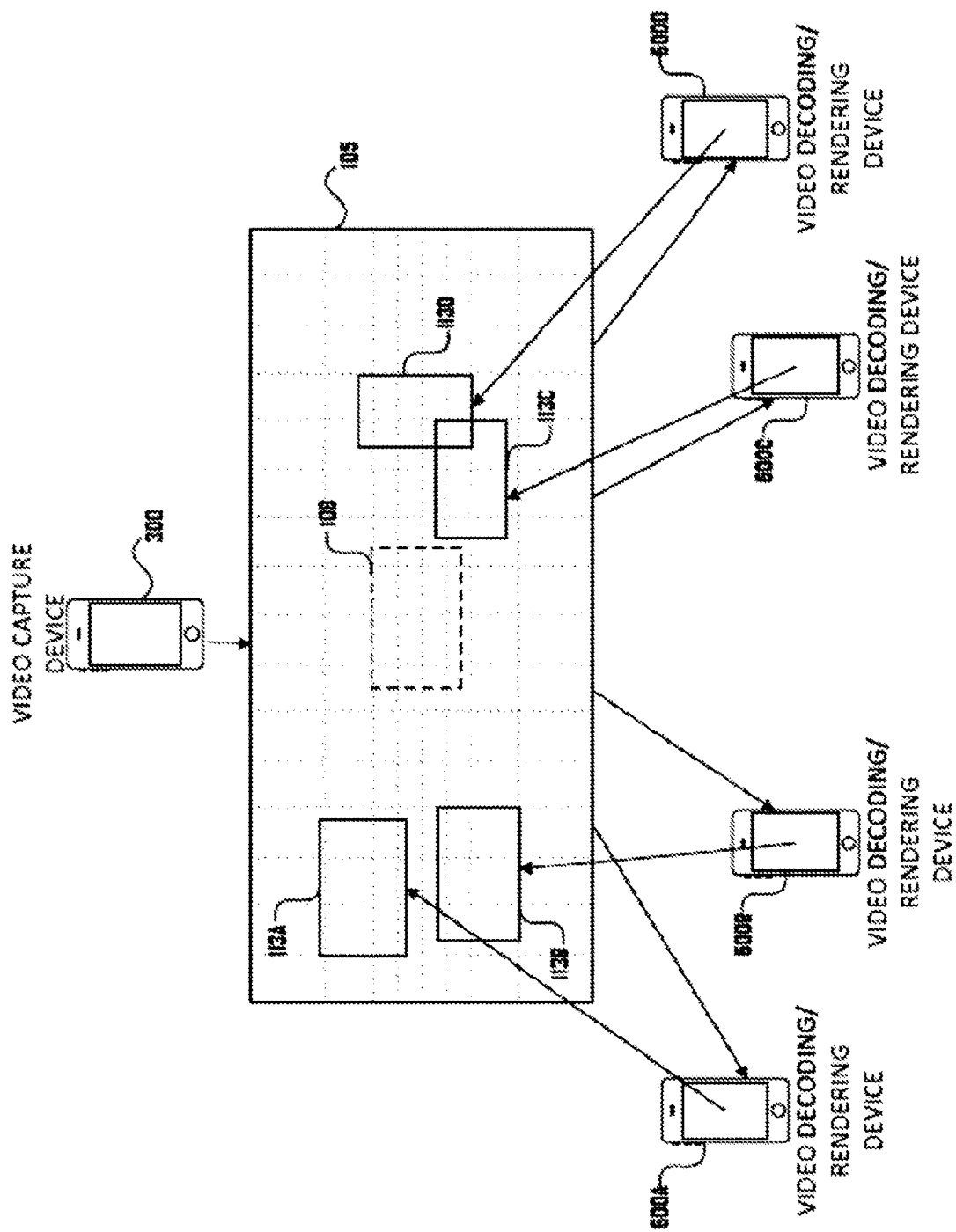
FIG. 1 illustrates a conceptual view of a large scale captured video frame and multiple separate viewport renderings of the captured video frame in accordance with at least one embodiment.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Various aspects of the present methods and systems are directed to creating, generating, providing, storing, obtaining, and/or rendering multi-layer video sequences and/or video streams. In various embodiments, such methods and systems may be useful when a video capture/encoding device is used to capture wide-frame, panoramic video sequences (such as a "360 video" or "180 video" sequence), when a video decoding/rendering device is used to render a dynamically selected spatial portion of such a wide-frame, panoramic video sequence (as opposed to, e.g., a temporal portion), and the like. In other embodiments, such methods and systems may be useful for combining a video sequence with data relevant to a spatial portion of a video sequence, such as an identifier generated by a facial recognition module, rendering such a combined video sequence, and the like.

For example, one exemplary scenario may proceed similar to the following. An individual may use a video capture/encoding device, such as a camera-enabled smart phone equipped with a wide-angle or fish-eye lens, to capture a video sequence and provide frames of the video sequence to a video data buffer; identify such frames of the video sequence, e.g. via data communication with the video data buffer; if necessary, e.g. in the case of a wide-angle or fish-eye lens, transform each frame of the video sequence to a rectilinear format; divide each frame into an array of sub-sections, referred to herein as patches; select one or more patches of each frame for supplemental processing (as is described below, in certain embodiments, such selection of the one or more patches for supplemental processing may be informed by dynamic feedback obtained from one or more rendering devices, such feedback corresponding to a spatial portion of the wide-frame video sequence selected for rendering); cause the frames of the video sequence to be encoded by a video encoding module and cause the selected patches to be processed by one or more supplemental processing module(s) (in some embodiments the video encoding module may act as a supplemental processing module and cause the selected patches to be encoded at a higher resolution than the frame as a whole); and cause a transport stream assembler to construct a multi-layer video transport stream wherein, for each frame of the video sequence:
- a first, base layer of the transport stream includes data corresponding to an encoded version of the current frame; and
- one or more supplemental layers of the transport stream include meta-data corresponding to the division of the current frame into patches and data corresponding to the output of the supplemental processing of the selected patches of the current frame.

Certain embodiments are applicable to enabling selective partial rendering of wide-frame, panoramic video sequences via a display, wherein the portion of the video sequence being rendered is dynamically selectable in response to input, e.g. such as user of a hand-held client device moving the device. The video decoding/rendering device may, during the rendering of the supplemented video sequence, obtain data (e.g. user input data) associated with a desired viewport within the panoramic video and provide corresponding dynamic viewport feedback to the video capture/encoding device. The video capture/encoding device may utilize such dynamic viewport feedback from the video decoding/rendering device when selecting patches of subsequent frames for supplemental processing.

Referring to FIG. 1 for example, a video capture/encoding device 300 (an embodiment of which is described below in reference to FIG. 3) may divide frames 105 of a video sequence into patches (indicated by dotted lines) and encode complete frames of the video sequence at a first resolution and select and encode patches of the wide frame video sequence at a second, higher resolution. The data corresponding to the encoded version of the complete frame may make up the base layer of a multi-layer transport stream and the data corresponding to the encoded version of the selected patches may make up the supplemental layer of the multi-layer transport stream.

Initially, the patches selected for the supplemental layer may be based on an initial, default viewport 108 within the wide-angle video sequence. Video decoding/rendering devices 600A-600D (an embodiment of which is described below in reference to FIG. 6) that obtain the multi-layer transport stream may render the initial, default viewport 108 (indicated by dashed lines) of the wide-angle video sequence at the second, higher resolution using the data from the supplemental layer of the multi-layer transport stream. If users of the video decoding/rendering devices 600A-600D indicate a desire to change the viewport from the initial, default viewport 108 to a new viewport 113A-113D, the respective video decoding/rendering device 600A-600D may (i) initially render the desired viewport 113A-113D at the first resolution using data from the base layer of the multi-layer transport stream and (ii) provide dynamic feedback data corresponding to the new viewport to the video capture/encoding device 300. The video capture/encoding device 300 may then adjust the selection of patches of the wide-frame video sequence for supplemental processing to correspond to the new viewport information provided by the dynamic feedback data. When the video decoding/rendering devices 600A-600D determine the supplemental layer data of the multi-layer transport stream corresponds to the currently selected viewport 113A-113D, the video decoding/rendering device may stop rendering the current viewport at the first resolution and begin rendering the current viewport at the second, higher resolution.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

Exemplary Video Capture and Rendering System

Figure 2:
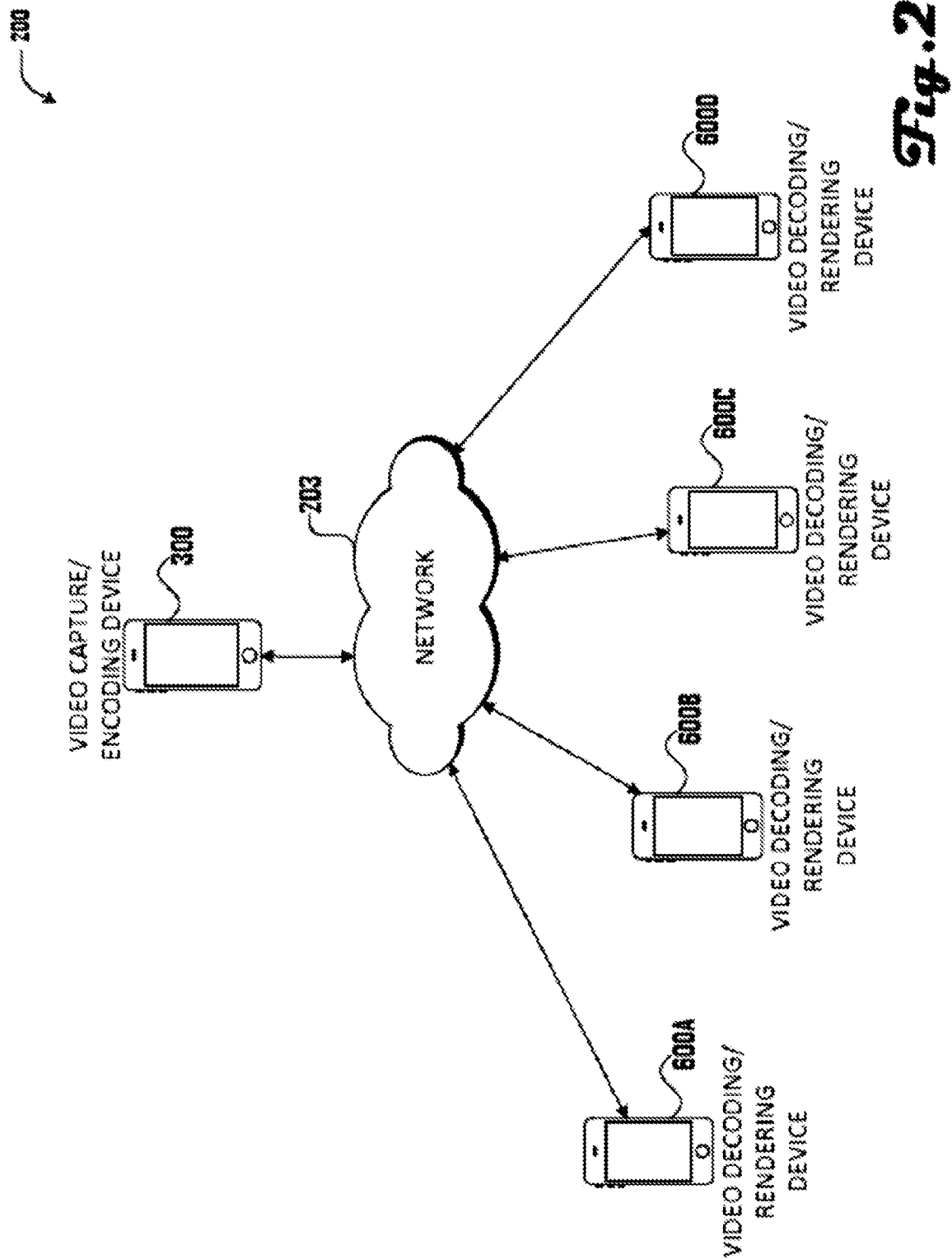
FIG. 2 illustrates an exemplary video capture/encoding/decoding/rendering system in accordance with at least one embodiment.

FIG. 2 illustrates an exemplary video encoding/decoding system 200 in accordance various aspects of the present methods and systems. A video capture/encoding device 300 (an example of which is described below in reference to FIGS. 3A and 3B) and video decoding/rendering devices 600A-600D (an example of which is described below in reference to FIGS. 4-B) are in data communication with a network 203. In many embodiments, there may be many more video capture/encoding devices 200, video decoding/rendering devices 300, and optional encoded-video sources 212 than are illustrated in FIG. 2.

Network 203 may include the Internet, one or more local area networks ("LANs"), one or more wide area networks ("WANs"), cellular data networks, and/or other data networks. Network 203 may, at various points, be a wired and/or wireless network.

As is described in more detail below, video capture/encoding device 300 may be a networked computing device generally capable of encoding video and providing the corresponding encoded video data to other devices over network 203. Similarly, video decoding/rendering devices 400A-400D may be a networked computing device generally capable of obtaining encoded video data from other devices over network 203 and decoding such encoded video data. In various embodiments, video capture/encoding device 300 and video decoding/rendering devices 400A-400D may be networked computing devices having a variety of form factors, such as a mobile-phone; a body camera, a "smart" watch, "smart" glasses, or other wearable computing device; a digital video camera; a computing tablet; a motor vehicle head unit; an audio-video on demand (AVOD) system; a dedicated media console; a gaming device, a "set-top box," a digital video recorder, a television, or a general purpose computer. The primary functional components of an exemplary video capture/encoding device 300 are described below in reference to FIG. 3. The primary functional components of an exemplary video decoding/ rendering devices 400A-400D are described below in reference to FIG. 4.

Exemplary Video Capture/Encoding Device

Figure 3:
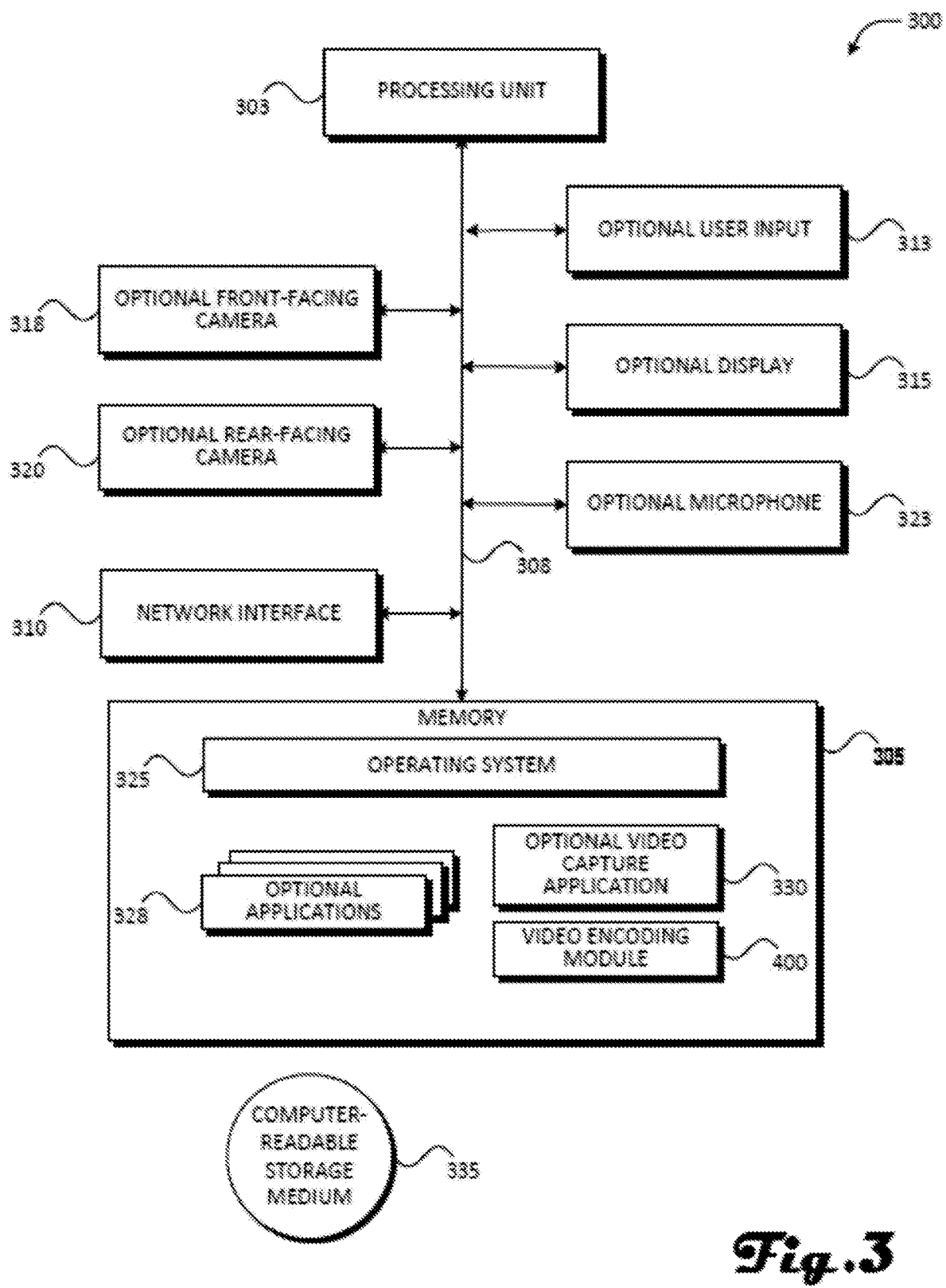
FIG. 3 illustrates several components of an exemplary encoding device, in accordance with at least one embodiment.

FIG. 3 illustrates several components of an exemplary video capture/encoding device 300 are illustrated. In some embodiments, a video capture/encoding device may include many more components than exemplary video capture/encoding device 300. However, it is not necessary for these generally conventional components to be shown in order to disclose an illustrative embodiment. As shown in FIG. 3, exemplary video capture/encoding device 300 includes a central processing unit 303 in data communication with memory 305 via a bus 308.

Central processing unit 303 may be an electronic circuit designed to carry out instructions of a computer program, e.g. obtained from memory 305, by performing the basic arithmetic, logical, control and input/output (I/O) operations specified by the program's instructions. Memory 305 may generally comprise some or all of random access memory (RAM), read-only memory (ROM), and/or a permanent mass storage device, such as a disk drive, flash memory, or the like. Bus 308 may be a communication system that transfers data between components within video capture/encoding device 300, and includes any related hardware components (wire, optical fiber, etc.) and software, including communication protocols.

Video capture/encoding device 300 may also include a network interface component 310 for connecting to a network, such as network 103; one or more optional user input device(s) 313, e.g. an alphanumeric keyboard, keypad, a mouse or other pointing device, a touchscreen, and/or a microphone (or a user input port for connecting an external user input device); an optional display 315 (or a display port for connecting an external display device); an optional front-facing camera 318 and/or an optional rear-facing camera 320 (or a camera input port for connecting one or more external cameras); and the like, all interconnected, along with network interface 310, via bus 308.

Memory 305 of exemplary video capture/encoding device 300 may store program code, executable by central processing unit 303, corresponding to an operating system 325, as well as program code corresponding to various optional computer program applications 328 (such a browser application, a social media application, a video conference application, and the like), a video capture application 330, and a video encoding module 400 (described below in reference to FIG. 4). The program code corresponding to operating system 325 and various computer program applications 328, video capture application 330, and video encoding module 400 may be loaded into memory 305 via network interface 310 and/or via a computer readable storage medium 335, such as a hard-disk drive, a solid-state drive, an optical disc, a removable memory card, and/or the like.

In operation, operating system 325 manages the hardware and software resources of video capture/encoding device 300 and provides common services and memory allocation for various computer program applications, such as video encoding application 333. For hardware functions such as network communications via network interface 310, capturing video camera via front-facing camera 318, and allocation of memory 305 for various software applications, such as video encoding application 330, operating system 325 acts as an intermediary between the computer program applications executing on video capture/encoding device 300 and the device's hardware. For example, operating system 325 may cause a representation of available software applications, such as optional applications 328 and/or video capture application 330, to be presented to a user of video capture/ encoding device 200 via display 315. If the user indicates, e.g. via input 313, a desire to use video capture application 330, operating system 325 may instantiate a video capture process (not shown), i.e. cause central processing unit 303 to begin executing the executable instructions of the video capture application and allocate a portion of memory 305 for its use.

Although an exemplary client device 300 has been described that generally conforms to conventional general purpose computing devices, a client device may be any of a great number of devices capable of communicating with network 108 and executing instructions corresponding to video encoding module 400.

Exemplary Video Encoding Module

FIG. 4 illustrates a data/control flow block diagram of an exemplary video encoding module 400, suitable use with a video capture/encoding device, such as video capture/encoding device 300.

Video encoding module may include a video data buffer 403; a video encoder, such as exemplary video encoder 2200, described below in reference to FIG. 22; a video pre-processing module 405, one or more supplemental processing modules 408, and a transport stream assembly module 410. In some embodiments, instead of including a supplemental processing module 408, video encoding module may make calls to an external supplemental processing module (not shown). In some embodiments, video encoder 2200 may act as a supplemental processing module.

Video capture application 333 (or another application operating on video C/E device 300) may cause video encoding module to initiate a video encoding process in accordance with the present methods and systems, e.g. by providing video data captured by front-facing camera 318 (and/or rear-facing camera 320) to video data buffer 403.

Figure 10:
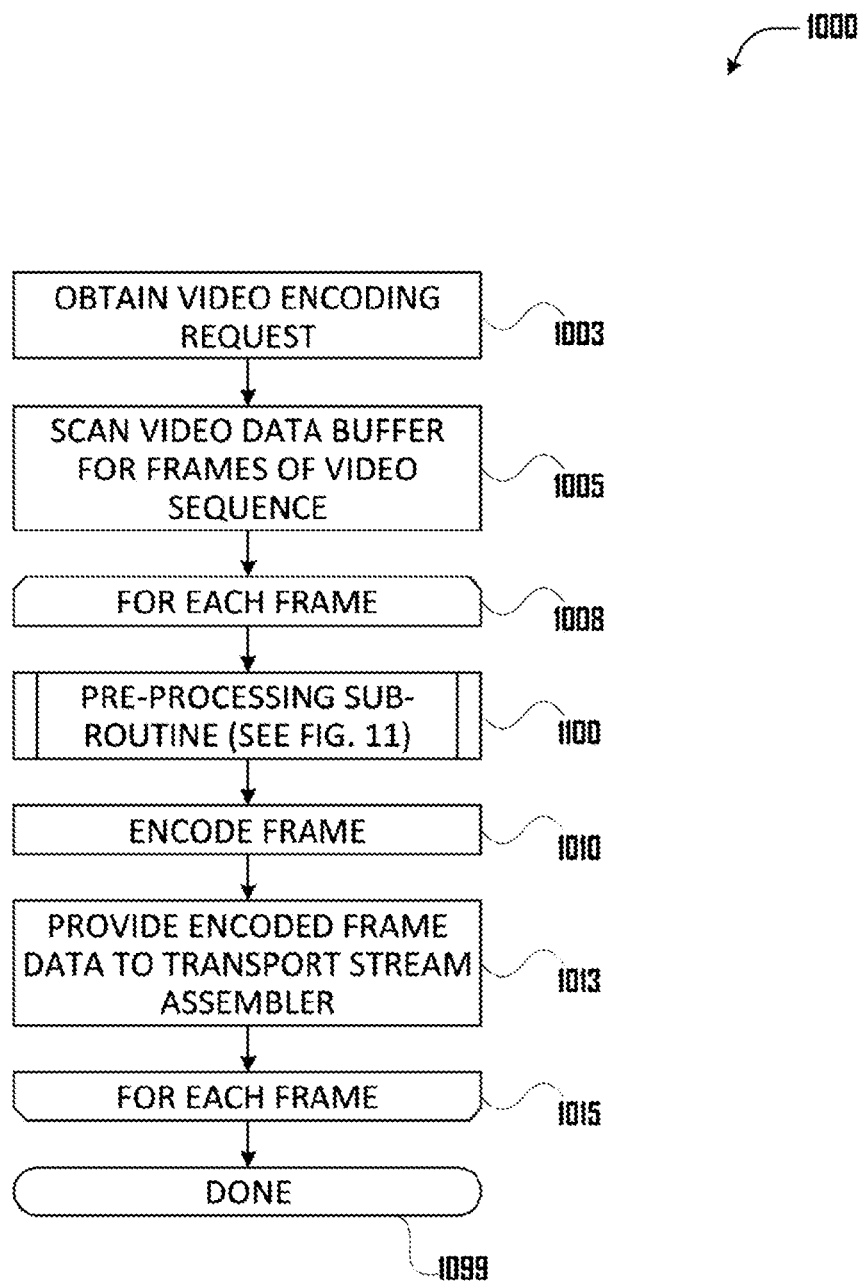
FIG. 10 illustrates a logic flow diagram of an exemplary video encoding routine in accordance with at least one embodiment.

Video preprocessing module 405 may responsively initiate a procedure to generate a multi-layer video transport stream, for example by executing a software routine such as exemplary video encoding routine 1000, illustrated in FIG. 10, and its respective sub-routines 1100-1500, illustrated in respective FIGS. 11-15.

In various embodiments, the video data provided to video data buffer 403 may correspond to a wide-frame, panoramic video sequence (such as a "360° video" or "180° video" sequence). If necessary, e.g. in the case video data captured using a wide-angle or fish-eye lens, pre-processing module 403 may transform the frames of the video sequence to a rectilinear format. The frames of the video sequence may then be provided to encoder 2200. Encoder 2200 may encode frames of the panoramic video sequence and provide corresponding encoded frames to multi-layer transport stream assembly module 410.

Figure 5A:
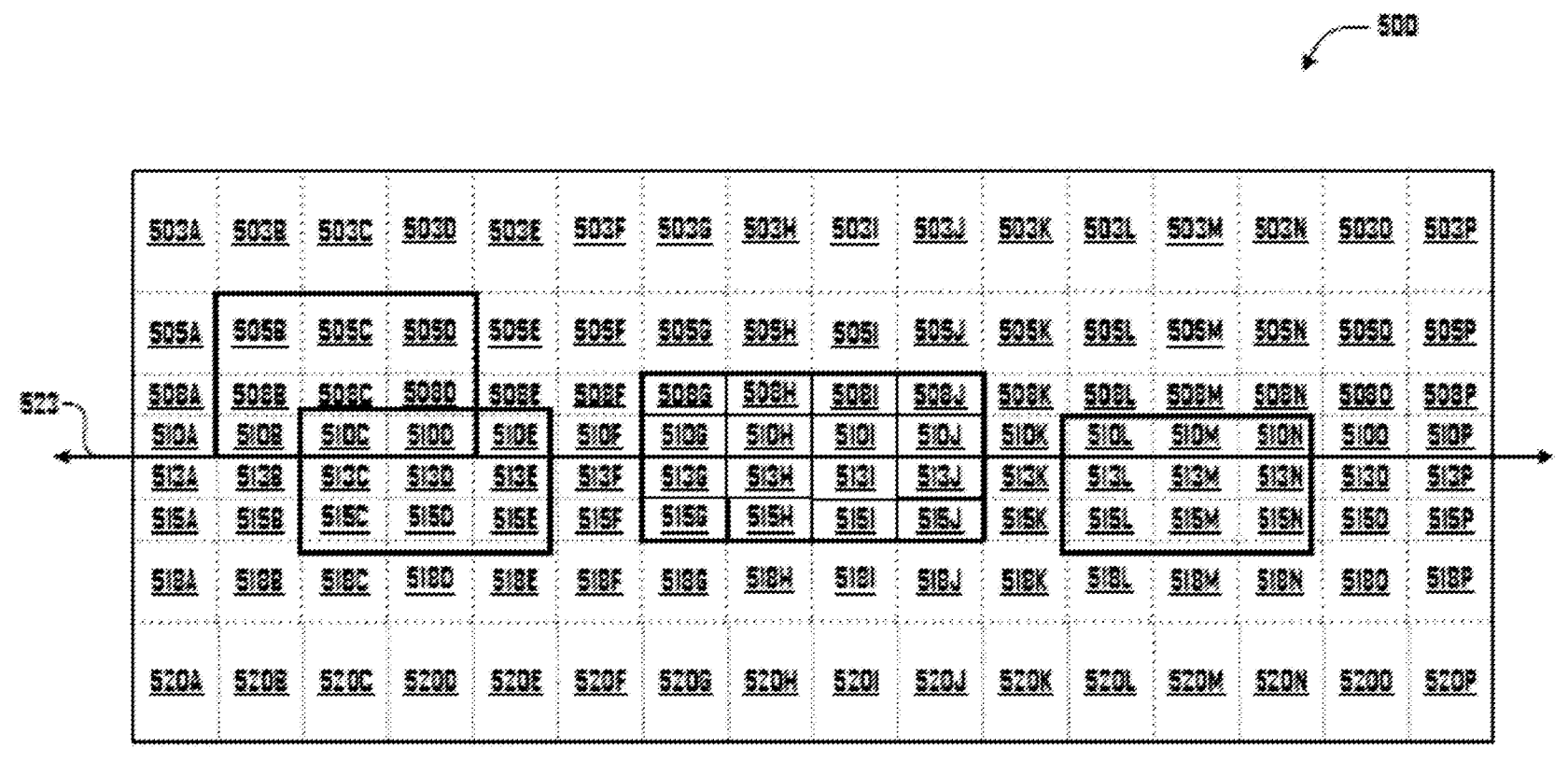

Referring also to FIGS. 5A-B, while the encoding process is ongoing pre-processing module 403 may divide frames of the video sequence, such as frame 500, into an array of sub-sections, referred to herein as patches 503A-520P. In certain applications, such as the case of a wide-frame, panoramic video sequence, the size of such patches may increase as a function of the patch's vertical distance from a transverse horizontal axis 523. In the example shown in FIG. 5, three patch sizes are shown, respectively corresponding to patches 503A-503P and 520A-520P, 505A-505P and 518A-518P, and 508A-515P.

Pre-processing module 403 may select one or more patches of each frame for supplemental processing. Initially, a set of default patches may be selected for supplemental processing, e.g. patches 508G-508J, 510G-510J, 513G-513J, and 515G-515J. The set of default patches may represent a horizontally and vertically centered viewport within the larger wide-angle video frame 500. As is described below, in some embodiments, the selection of the one or more patches for supplemental processing may be informed by dynamic feedback obtained from one or more rendering devices, such feedback corresponding to a spatial portion of the wide-frame video sequence selected for rendering.

Pre-processing module may then cause the selected patch (es) to be processed by supplemental processing module(s) 408. In some embodiments, video encoder 2200 may acts as a supplemental processing module. In such embodiments, the selected patches may be encoded at a higher resolution than the frame as a whole. In some embodiments, a supplemental processing module may be a facial or object recognition module.

Multi-Layer transport stream assembler 410 may obtain output bit-streams from video encoder 2200 and supplemental module(s) 408 and construct a multi-layer video transport stream wherein, for each frame of the video sequence:
- a first, base layer of the transport stream includes data corresponding to an encoded version of the current frame; and
- one or more supplemental layers of the transport stream include meta-data corresponding to the division of the current frame into patches and data corresponding to the output of the supplemental processing of the selected patches of the current frame.

Exemplary Video Decoding/Rendering Device

Figure 6:
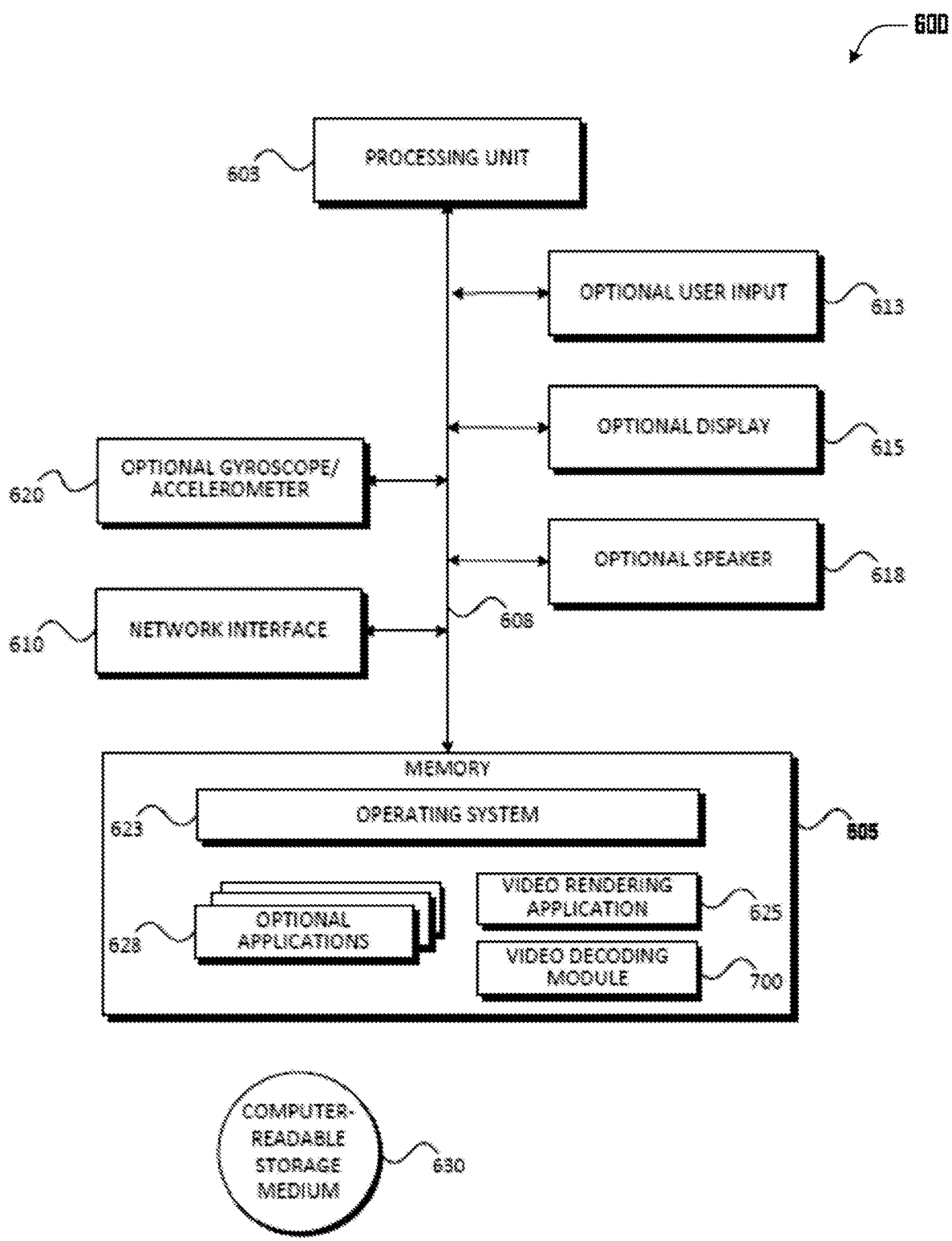
FIG. 6 illustrates several components of an exemplary decoding device, in accordance with at least one embodiment.

FIG. 6 illustrates several components of an exemplary video decoding/rendering device ("video D/R device") 600 are illustrated. In some embodiments, a video D/R device may suitable for use with the present methods and systems may include many more components than exemplary video D/R device 600. However, it is not necessary for these generally conventional components to be shown to disclose an illustrative embodiment. As shown in FIG. 6, exemplary video D/R device 600 includes a central processing unit 603 in data communication with memory 605 via a bus 608.

Central processing unit 603 may be an electronic circuit designed to carry out instructions of a computer program, e.g. obtained from memory 605, by performing the basic arithmetic, logical, control and input/output (I/O) operations specified by the program's instructions. Memory 605 may generally comprise some or all of random access memory (RAM), read-only memory (ROM), and/or a permanent mass storage device, such as a disk drive, flash memory, or the like. Bus 608 may be a communication system that transfers data between components within video D/R device 600, and includes any related hardware components (wire, optical fiber, etc.) and software, including communication protocols.

Video D/R device 600 may also include a network interface component 610 for connecting to a network, such as network 103; one or more optional user input device(s) 613, e.g. an alphanumeric keyboard, keypad, a mouse or other pointing device, a touchscreen, and/or a microphone (or a user input port for connecting an external user input device); an optional display 615 (or a display port for connecting an external display device); an optional speaker 618 (or audio output port for connecting one or more external speakers); an optional gyroscope/accelerometer unit 620; and the like, all interconnected, along with network interface 610, via bus 608.

Memory 605 of exemplary video D/R device 600 may store program code, executable by central processing unit 603, corresponding to an operating system 623, as well as program code corresponding to a video rendering application, 625, various optional computer program applications 628 (such a browser application, a social media application, a video conference application, and the like), a video decoding module 700 (described below in reference to FIG. 7). The program code corresponding to operating system 623, video rendering application 625, and various other computer program applications 628, and video decoding module 700 may be loaded into memory 605 via network interface 610 and/or via a computer readable storage medium 630, such as a hard-disk drive, a solid-state drive, an optical disc, a removable memory card, and/or the like.

In operation, operating system 623 manages the hardware and software resources of video D/R device 600 and provides common services and memory allocation for various computer program applications, such as video rendering application 625. For hardware functions such as network communications via network interface 610 and allocation of memory 605 for various software applications, such as video rendering application 625 and video decoding module 700, operating system 623 acts as an intermediary between the computer program applications executing on video D/R device 600 and the device's hardware. For example, operating system 623 may cause a representation of available software applications to be presented to a user of video D/R device 600 via display 615. If the user indicates, e.g. via input 613, a desire to use video rendering application 625, operating system 623 may instantiate a video rendering process (not shown), i.e. cause central processing unit 603 to begin executing the executable instructions of the video rendering application and allocate a portion of memory 605 for its use.

Although an exemplary video D/R device 600 has been described that generally conforms to conventional general purpose computing devices, a client device may be any of a great number of devices capable of communicating with network 108 and executing instructions for performing client CPR/SN application 624.

Exemplary Video Decoding Module

FIG. 7 illustrates a data/control flow block diagram of an exemplary video decoding module 700, suitable use with a video capture/encoding device, such as video D/R device 600.

Video decoding module 700 may include a transport stream dissembler 703; a video decoder, such as exemplary video decoder 2300, described below in reference to FIG. 23; a video post-processing module 705, one or more supplemental processing modules 708, and a transport stream assembly module 710. In some embodiments, instead of including one or more supplemental processing modules 708, video decoding module 700 may make calls to an external supplemental processing module (not shown). In some embodiments, video decoder 2300 may act as a supplemental processing module.

Video rendering application 633 (or another application operating on video D/R device 600) may cause video decoding module 700 to initiate a video decoding process in accordance with the present methods and systems, e.g. by causing the video D/R device to obtain a multi-layer video stream, e.g. from video C/E device 300, via network interface 610.

Figure 16:
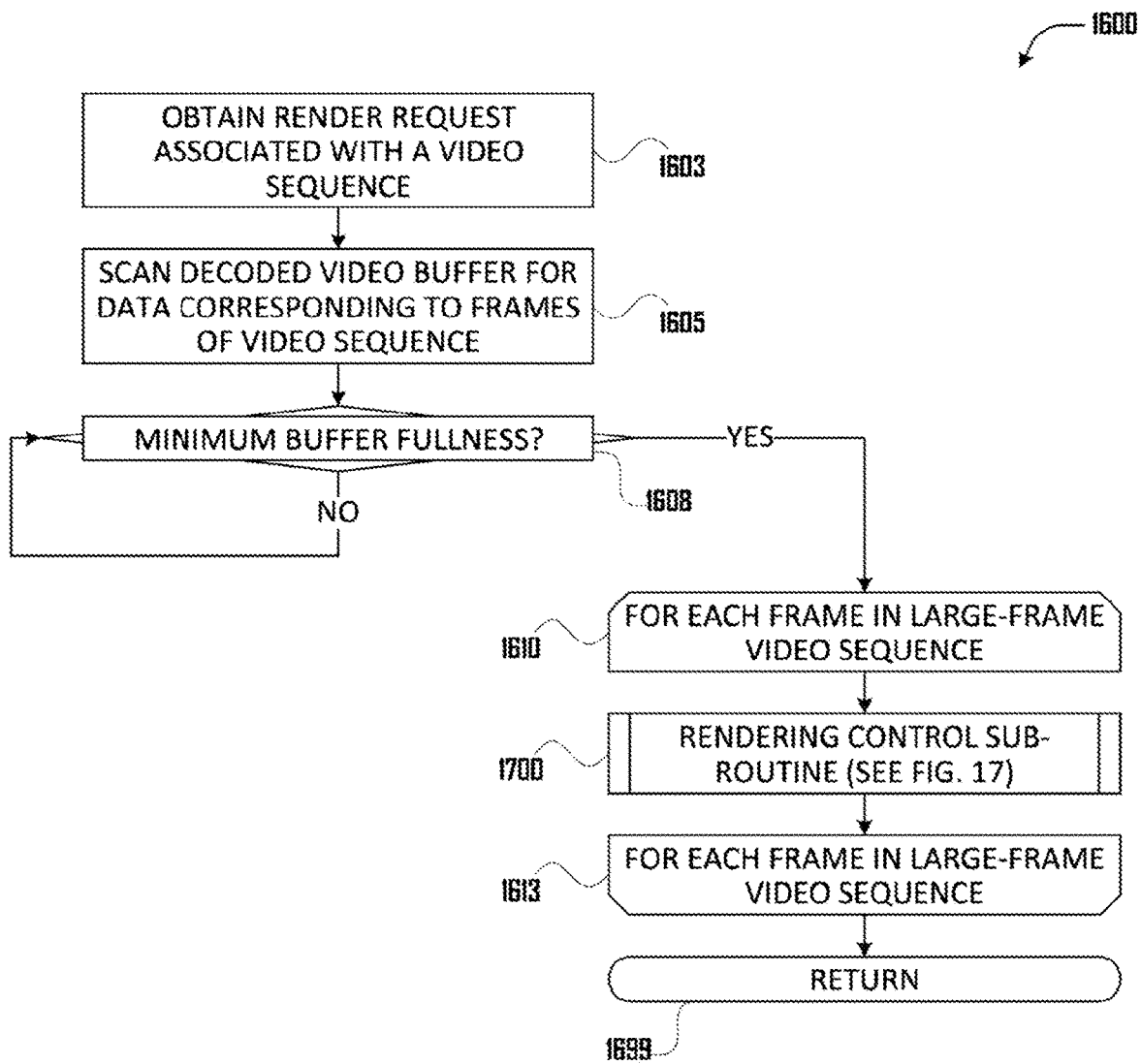
FIG. 16 illustrates a logic flow diagram of an exemplary video rendering routine in accordance with at least one embodiment.

Video post-processing module 705 may responsively initiate a procedure to render a supplemented video sequence multi-layer video transport stream, for example by executing a software routine such as exemplary multi-layer large frame video rendering routine 1600, illustrated in FIG. 16, and its respective sub-routines 1700-2100, illustrated in FIGS. 17-21.

In various embodiments, the multi-layer transport stream provided to transport stream dissembler 703 may include:
- a first, base layer corresponding to an encoded version of a wide angle/panoramic video sequence; and
- one or more supplemental layers corresponding to metadata associated with the division of the current frame into patches and supplemental data, as is described in more detail above.

The data corresponding to the base layer of the multi-layer transport stream may be provided to decoder 2300. Decoder 2300 may decode frames of the wide angle/panoramic video sequence and provide corresponding decoded frames to post-processing module 705.

The supplemental data may be provided to supplemental processing module(s) 708. Supplemental processing module(s) 708 may process the supplemental data and provide the resulting data to video post processing module 705.

Exemplary Video Pre-Processing and Video Post-Processing Feedback System

FIG. 8 illustrates an exemplary feedback system 800 between a video C/E device 300 and an exemplary video D/R device 600, in accordance with the present methods and systems. In some embodiments, particularly in a video streaming application, video post-processing module 705 may provide dynamic feedback data to video pre-processing module 405 related to identifying which patches of subsequent frames should be selected for supplemental processing. For example, such embodiments are applicable to enabling selective partial rendering of wide-frame, panoramic video sequences.

Video post-processing module 705, operating within video D/R device 600, may obtain a multi-layer TS 803, as described above, and cause a supplemented initial default viewport 528, illustrated in FIG. 5B, of a video sequence to be rendered by the video D/R device. During the rendering of a supplemented video sequence, video post-processing module 705 may obtain data (e.g. user input data) associated with a desired viewport selection, such as viewport 530A illustrated in FIG. 5B, within the panoramic video and provide corresponding dynamic viewport selection feedback 805 to video capture/encoding device 300. Video pre-processing module 405 operating within video capture/encoding device 300 may utilize such dynamic viewport selection feedback from video post-processing module 705, operating within video decoding/rendering device 600, when selecting patches of subsequent frames for supplemental processing.

Referring to FIG. 5A for example, video capture/encoding device 300 may divide frame 500 of a video sequence into patches and encode complete frames of the video sequence at a first resolution and select and encode specific patches of the wide frame video sequence, e.g. patches 508G-508J, 510G-510J, 513G-513J, and 515G-515J, at a second, higher resolution. The data corresponding to the encoded version of the complete frame may make up the base layer of the multi-layer transport stream and the data corresponding to the encoded version of the selected patches may make up the supplemental layer of the multi-layer transport stream.

Initially, the patches selected for the supplemental layer may be based on an initial, default viewport 528 within the wide-angle video sequence. Video decoding/rendering device 600 may obtain the multi-layer transport stream and render the initial, default viewport 528 of the wide-angle video sequence at the second, higher resolution using the data from the supplemental layer of the multi-layer transport stream. If users of video D/R device 600 indicates a desire to change the viewport from the initial, default viewport 528 to a new viewport 530A, video D/R device 600 may (i) initially render the desired viewport 530A at the first resolution using data from the base layer of the multi-layer transport stream and (ii) provide dynamic viewport selection feedback data corresponding to new viewport 530A to video C/E device 300. The video C/E device 300 may then adjust the selection of patches of the wide-frame video sequence for supplemental processing to correspond to the new viewport information provided by the dynamic feedback data. When video D/R device 600 determines the supplemental layer data of the multi-layer transport stream corresponds to the currently selected viewport 530A, the video D/R device may stop rendering the current viewport at the first resolution and begin rendering the current viewport at the second, higher resolution.

In some embodiments, particularly in a video streaming application, the post-processing module 705 may provide dynamic feedback data to the pre-processing module 405 related to identifying which patches of subsequent frames should be selected for supplemental processing. For example, various implementations discussed herein are applicable to enabling selective partial rendering of wide-frame, panoramic video sequences.

Exemplary Communications

Figure 9A:
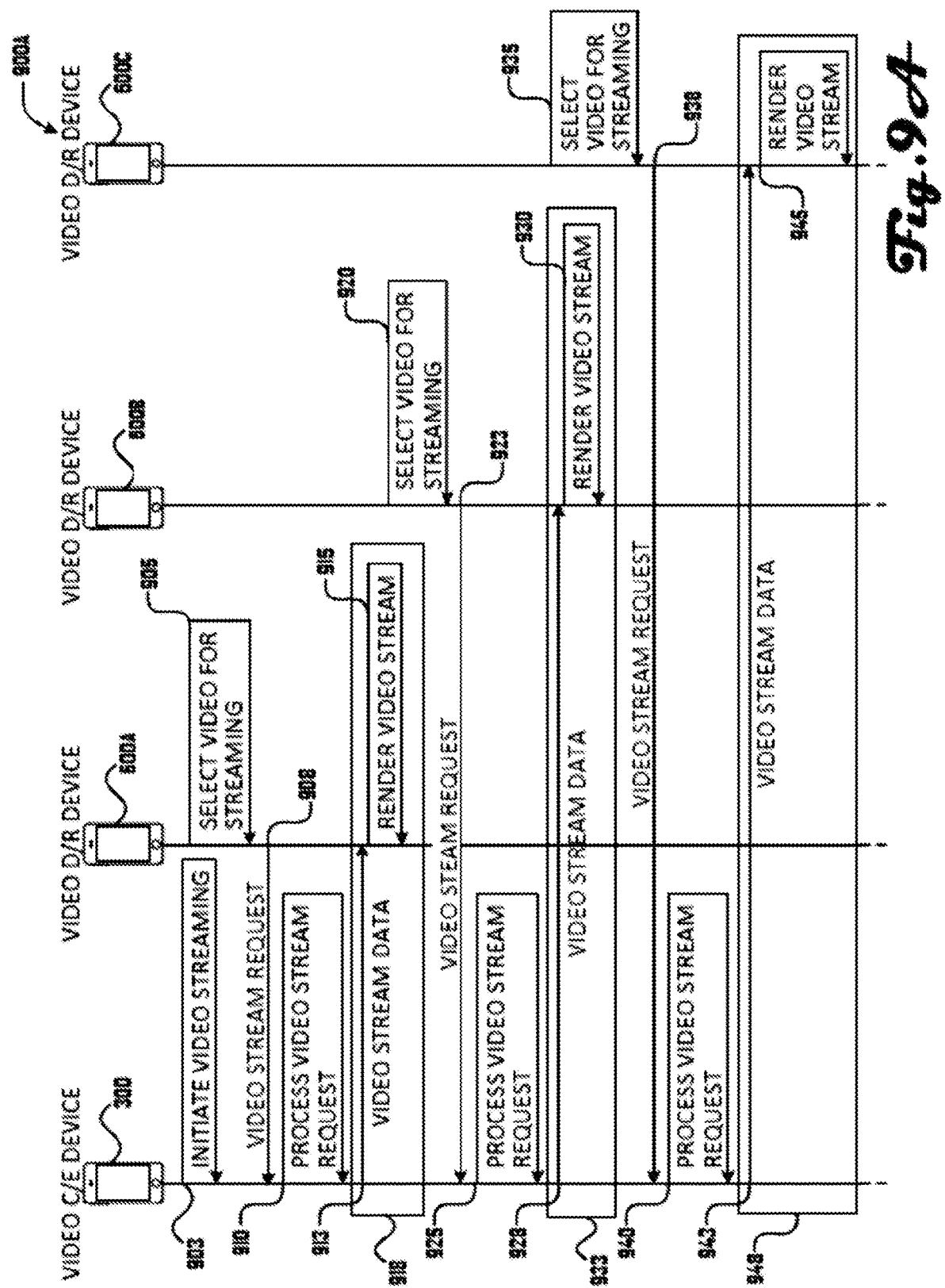
FIGS. 9A-B illustrate exemplary series of communications between various devices shown in FIG. 2 in accordance with at least one embodiment.

FIG. 9A illustrates an exemplary exchange of communications 900 between various devices in accordance with the present methods and systems.

Video C/E device 300 may initiate 903 a multi-layer video streaming process in accordance with the various aspects of the present methods and systems described above.

Sometime after initiation 903 of the multi-layer streaming process, video D/R device 600A may obtain 905 a selection associated with the multi-layer video stream. For example, an instantiation of a browser application (not shown) may obtain a selection of a URI corresponding to the multi-layer video stream. Video D/R device 600A may responsively provide a multi-layer video stream request 908 to video C/E device 300.

Video C/E device 300 may process 910 multi-layer video stream request 908 in accordance with the present methods and systems, e.g. as described above in reference to FIG. 4 and begin providing a multi-layer video transport stream 913 to video D/R device 600A. Video D/R device 600A may process 915 multi-layer video transport stream 913 in accordance with the present methods and systems, e.g. as described above in reference to FIG. 7.

Now also referring to FIG. 1, multi-layer video transport stream 913 may include, for example, a base layer corresponding to a relatively low-resolution encoded video sequence depicting relatively large view 105 (e.g. a wide-angle/panoramic video sequence) and a supplemental layer corresponding to relatively high-resolution encoded video sequence depicting a default initial viewport 108 within the wide-angle video sequence.

The provision of multi-layer transport stream 913 by video C/E device 300 and the processing 915 of the multi-layer transport stream in accordance with the present methods and systems may form an ongoing video streaming process 918 that continues in parallel with the communications described below.

Sometime after initiation 903 of the multi-layer streaming process, video D/R device 600B may obtain 920 a selection associated with the multi-layer video stream. For example, an instantiation of a social media application may obtain a selection of a URI corresponding to the multi-layer video stream. Video D/R device 600B may responsively provide a multi-layer video stream request 923 to video C/E device 300.

Video C/E device 300 may process 925 multi-layer video stream request 923 in accordance with the present methods and systems, e.g. as described above in reference to FIG. 4 and begin providing a multi-layer video transport stream 928 to video D/R device 600B. Video D/R device 600B may process 930 multi-layer video transport stream 928 in accordance with the present methods and systems, e.g. as described above in reference to FIG. 7.

As in the case of multi-layer video transport stream 913, multi-layer video transport stream 928 may include a base layer corresponding to a relatively low-resolution encoded video sequence depicting relatively large view 105 (e.g. a wide-angle/panoramic video sequence) and a supplemental layer corresponding to relatively high-resolution encoded video sequence depicting a default initial viewport 108 within the wide-angle video sequence.

The provision of multi-layer transport stream 928 by video C/E device 300 and the processing 930 of the multi-layer transport stream in accordance with the present methods and systems may form an ongoing video streaming process 933 that continues in parallel with the communications described below.

Sometime after initiation 903 of the multi-layer streaming process, video D/R device 600C may obtain 935 a selection associated with the multi-layer video stream. For example, an instantiation of a conferencing application may obtain a selection of a URI corresponding to the multi-layer video stream. Video D/R device 600C may responsively provide a multi-layer video stream request 938 to video C/E device 300.

Video C/E device 300 may process 940 multi-layer video stream request 938 in accordance with the present methods and systems, e.g. as described above in reference to FIG. 4 and begin providing a multi-layer video transport stream 943 to video D/R device 600C. Video D/R device 600C may process 945 multi-layer video transport stream 943 in accordance with the present methods and systems, e.g. as described above in reference to FIG. 7.

The provision of multi-layer transport stream 943 by video C/E device 300 and the processing 945 of the multi-layer transport stream in accordance with the present methods and systems may form an ongoing video streaming process 948 that continues in parallel with the communications described below.

Similar to multi-layer video transport stream 913 and multi-layer video transport stream 928, multi-layer video transport stream 943 may include a base layer corresponding to a relatively low-resolution encoded video sequence depicting relatively large view 105 (e.g. a wide-angle/panoramic video sequence) and a supplemental layer corresponding to relatively high-resolution encoded video sequence depicting a default initial viewport 108 within the wide-angle video sequence.

Figure 9B:
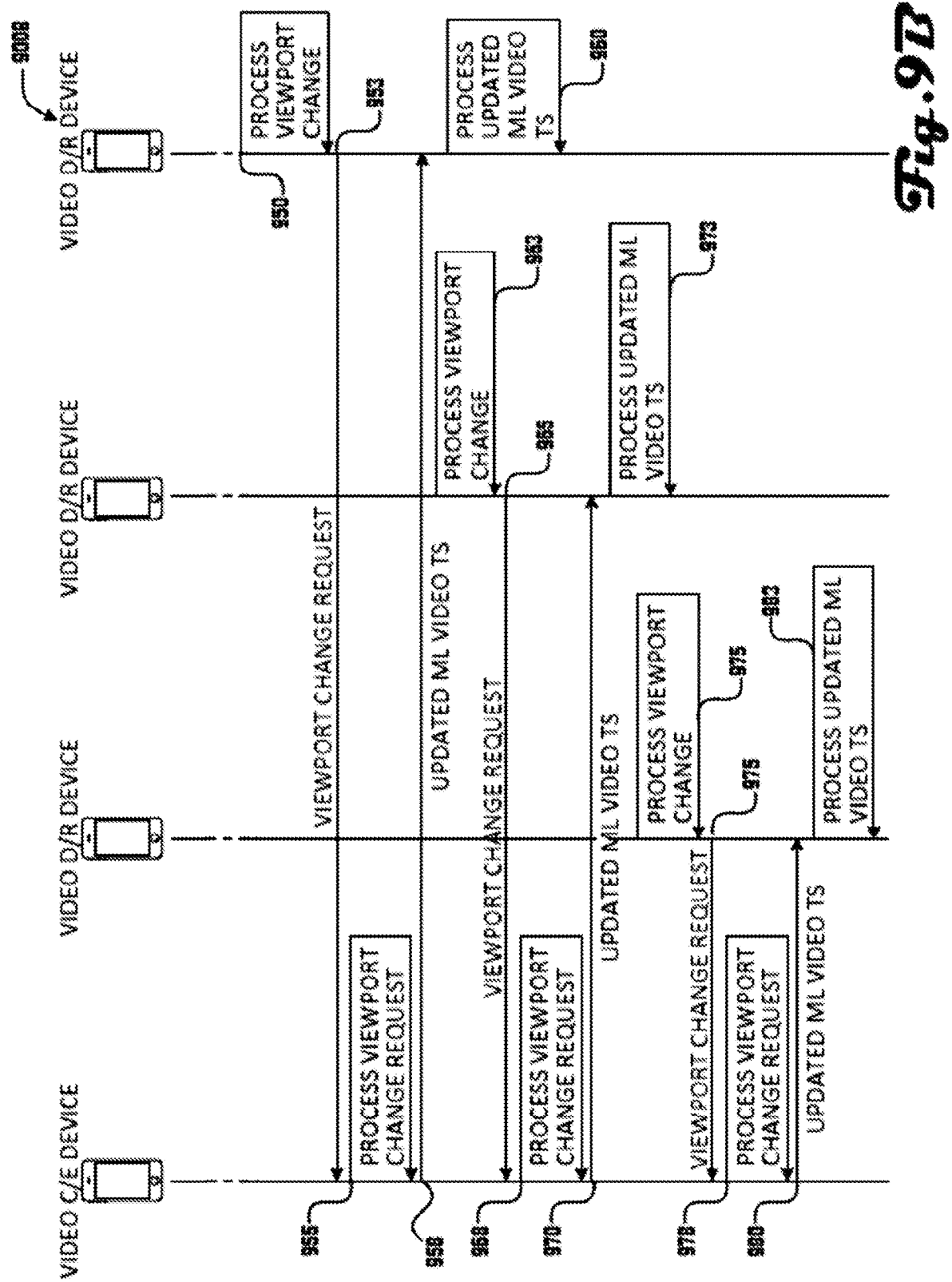

Referring now to FIG. 9B, sometime during ongoing video streaming process 948, video D/R device 600C may process 950 a viewport change request, such as is described above, and provide a viewport change request 953 to video C/E device 300. Video C/E device may process 955 viewport change request 953, such as is described above in reference to FIG. 4, and provide an updated multi-layer video transport stream 958 to video D/R device 600C. Updated multi-layer video transport stream 958 may include, for example, a base layer corresponding to the relatively low-resolution encoded video sequence depicting relatively large view 105 (e.g. a wide-angle/panoramic video sequence) and an updated supplemental layer corresponding to relatively high-resolution encoded video sequence depicting an updated viewport 113A within the wide-angle video sequence. Video D/R device 600C may then process 960 updated multi-layer video transport stream 958.

Similarly, sometime during ongoing video streaming process 933 and ongoing video streaming process 918 video D/R devices 600B, 600A may respectively process 963, 973 viewport change requests, such as is described above in reference to FIG. 7, and provide viewport change requests 965, 975 to video C/E device 300. Video C/E device may process 968, 978 viewport change requests 965, 975, such as is described above in reference to FIG. 4, and provide updated multi-layer video transport streams 970, 980 to video D/R devices 600B, 600A. Updated multi-layer video transport streams 970, 980 may each include a base layer corresponding to the relatively low-resolution encoded video sequence depicting relatively large view 105. Updated multi-layer transport stream 970 may include an updated supplemental layer corresponding to relatively high-resolution encoded video sequence depicting an updated viewport 113C within the wide-angle video sequence and updated multi-layer transport stream 980 may include an updated supplemental layer corresponding to relatively high-resolution encoded video sequence depicting an updated viewport 113D within the wide-angle video sequence.

Exemplary Video Encoding Routine

FIG. 10 illustrates an exemplary video encoding routine 1000 suitable for use with various aspects of the present methods and systems in order to generate a multi-layer video transport stream, as is described above. For example, video encoding routine 1000 may be implemented by the hardware of a video capture/encoding device, such as exemplary video capture/encoding device 300, in order to enable the functionality of a video coding module with multi-layer transport stream capabilities, such as exemplary video coding module 400.

Video encoding routine 1000 may obtain a video encoding request at execution block 1003.

Video encoding routine 1000 may scan a video data buffer for frames of a video sequence at execution block 1005. In the case of exemplary video coding module 400, for example, video encoding routine 1000 may scan video data buffer 403.

At starting loop block 1008, video encoding routine 1000 may process each frame of the video sequence found in the video data buffer in turn.

Video encoding routine 1000 may provide the current frame of the video sequence to a pre-processing sub-routine 1100, described below with reference to FIG. 11.

Video encoding routine 1000 may then encode the current frame at execution block 1010. In the case of exemplary video coding module 400, for example, video encoding routine 1000 may cause video encoder 2200 to encode the current frame.

Video encoding routine 1000 may then provide the encoded frame data to a transport stream assembler execution block 1013. In the case of exemplary video coding module 400, for example, video encoding routine 1000 may cause the output of video encoder 2200, to be provided to multilayer transport stream assembly module 410 as base layer data.

At ending block 1015, video encoding routine 1000 may back to starting block 1008 to process the next frame of the video sequence found video data buffer, if any.

Video encoding routine 1000 may end at done block 1099.

Exemplary Video Pre-Processing Sub-Routine

Figure 11:
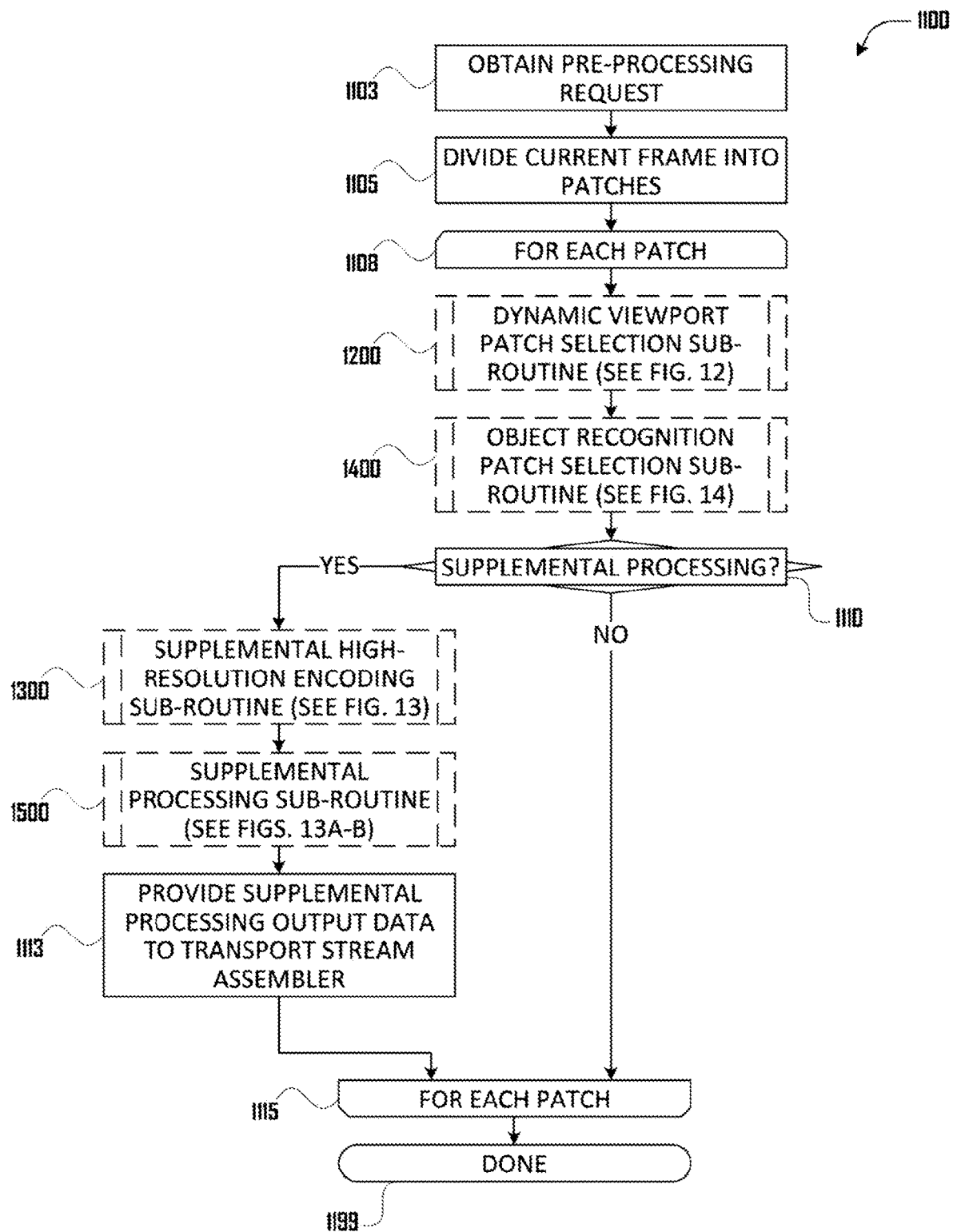
FIG. 11 illustrates a logic flow diagram of an exemplary video pre-processing sub-routine in accordance with at least one embodiment

FIG. 11 illustrates an exemplary video preprocessing sub-routine 1100 suitable for use with various aspects of the present methods and systems. For example, video pre-processing sub-routine 1100 may be called by an encoding routine, such as video encoding routine 1000 described above, and be implemented by the hardware of a video capture/encoding device, such as exemplary video capture/encoding device 300, in order to enable the functionality of a video pre-processing module 405.

Video pre-processing sub-routine 1100 may obtain a frame preprocessing request at execution block 1103. For example, video encoding routine 1000 may provide a frame preprocessing request to video pre-processing sub-routine 1100, as is described above. The frame preprocessing request may include identifying data corresponding to an unencoded video frame in a video data buffer.

Video pre-processing sub-routine 1100 may divide the identified frame into a plurality of patches at execution block 1105. For example, video pre-processing sub-routine 1100 may divide the identified frame similarly to frame 500, as described above with reference to FIG. 5A.

At starting block 1108, video pre-processing sub-routine 1100 may process each patch of the identified frame in turn.

Video pre-processing sub-routine 1100 may call a supplemental processing patch selection sub-routine, such as exemplary dynamic viewport patch selection sub-routine 1200, described below with reference to FIG. 12, and/or exemplary object recognition patch selection sub-routine 1400, described below with reference to FIG. 14.

At decision block 1110, if the supplemental processing patch selection sub-routine returns a value indicating the current patch is not suitable for supplemental processing, then video pre-processing sub-routine 1100 may proceed to ending loop block 1115; otherwise, video pre-processing sub-routine 1100 may call a supplemental processing sub-routine to process the current patch, such as exemplary high-resolution encoding sub-routine 1300, described below with reference to FIG. 13 and/or exemplary object recognition sub-routine 1500, described below with respect to FIG. 15.

Video pre-processing sub-routine 1100 may provide the resulting supplemental processing output data to a transport stream assembler at execution block 1113. In the case of exemplary video coding module 400, for example, video pre-processing sub-routine 1100 may cause the output of one or more supplemental processing modules 408 and/or video encoder 2200 to be provided to multilayer transport stream assembly module 410 as supplemental layer data.

Exemplary Viewport Selection Supplemental Processing Sub-Routines

Figure 12:
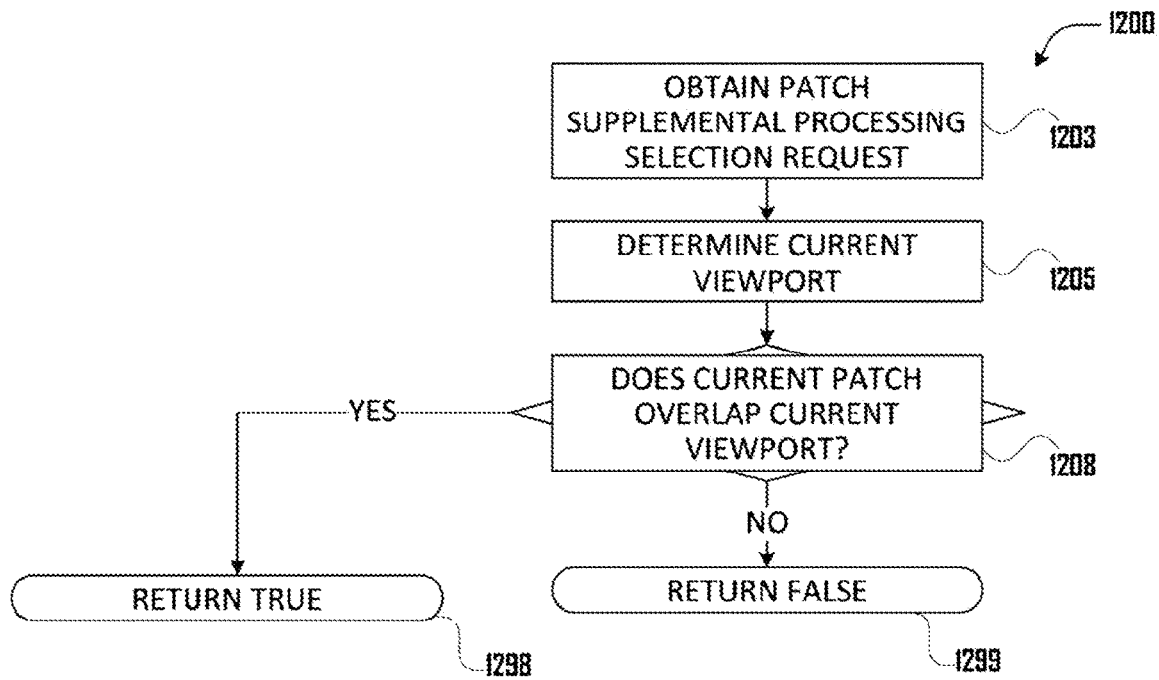
FIG. 12 illustrates a logic flow diagram of an exemplary dynamic viewport patch selection sub-routine in accordance with at least one embodiment.
Figure 13:
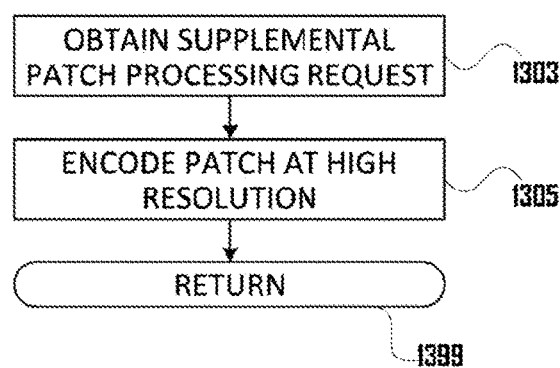
FIG. 13 illustrates a logic flow diagram of an exemplary high-resolution encoding sub-routine in accordance with at least one embodiment.

FIGS. 12 and 13 respectively illustrate an exemplary dynamic viewport patch selection sub-routine 1200 and an exemplary high-resolution encoding sub-routine 1300, suitable for use with various aspects of the present methods and systems. For example, dynamic viewport patch selection sub-routine 1200 and sub-routine 1300 may be called by a video preprocessing sub-routine, such as video pre-processing sub-routine 1100, described above, and be implemented by the hardware of a video capture/encoding device, such as exemplary video capture/encoding device 300, in order to enable the functionality of video pre-processing module 405. For example, dynamic viewport patch selection sub-routine 1200 and high-resolution encoding sub-routine 1300 may be useful for implementing a feedback system between a video capture/encoding device and a video decoding/rendering device, such as feedback system 800, described above with reference to FIG. 8.

Referring first to FIG. 12, dynamic viewport patch selection sub-routine 1200 may obtain a supplemental processing patch selection request at execution block 1203. For example, Dynamic viewport patch selection sub-routine 1200 may determine a current viewport for the current frame at execution block 1205. For example, as is described above with reference to FIG. 8 and FIGS. 5A-B.

At decision block 1208, if the current patch overlaps the current viewport, then dynamic viewport patch selection sub-routine 1200 may return a true value at return block 1298; otherwise dynamic viewport patch selection sub-routine 1200 may return a false value return block 1299.

Referring now to FIG. 13, exemplary high-resolution encoding sub-routine 1300 may obtain a supplemental processing request at execution block 1303.

High-resolution encoding sub-routine 1300 may encode the identified patch at a high resolution at execution block 1305. For example, high-resolution encoding sub-routine 1300 may encode the identified patch at a high-resolution relative to the encoding of the frame as a whole, described above with reference to execution block 1010 in video encoding routine 1000.

High-resolution encoding sub-routine 1300 may end at return block 1399.

Exemplary Object Recognition Supplemental Processing Sub-Routines

Figure 14:
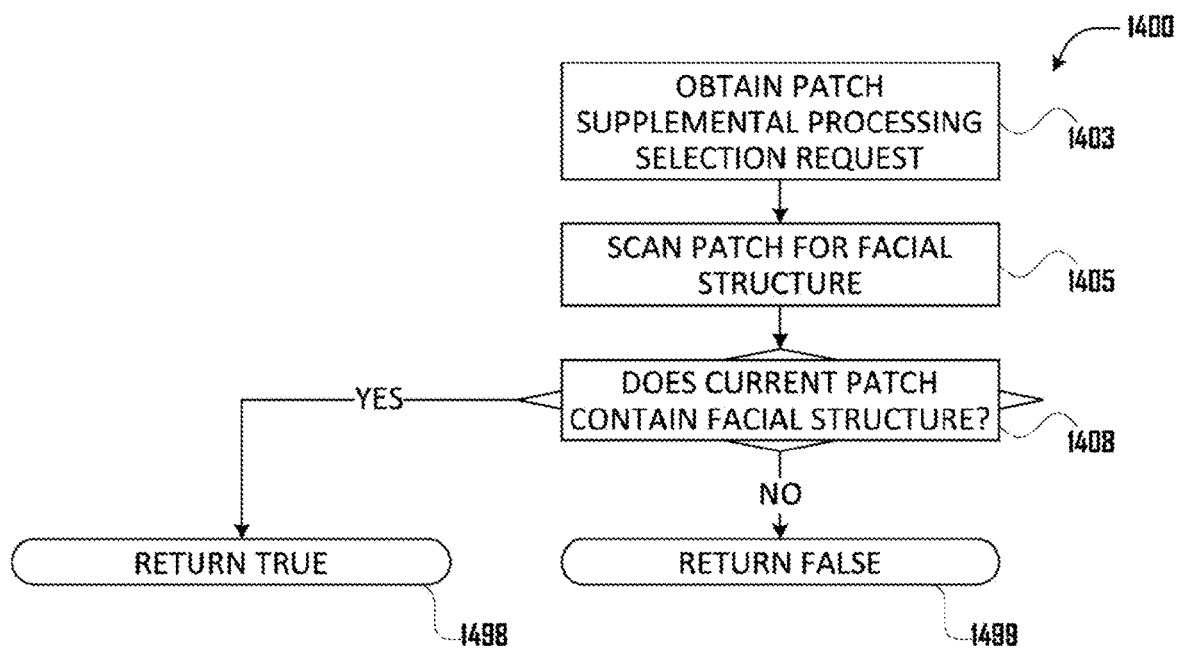
FIG. 14 illustrates a logic flow diagram of an exemplary object recognition patch selection sub-routine in accordance with at least one embodiment.
Figure 15:
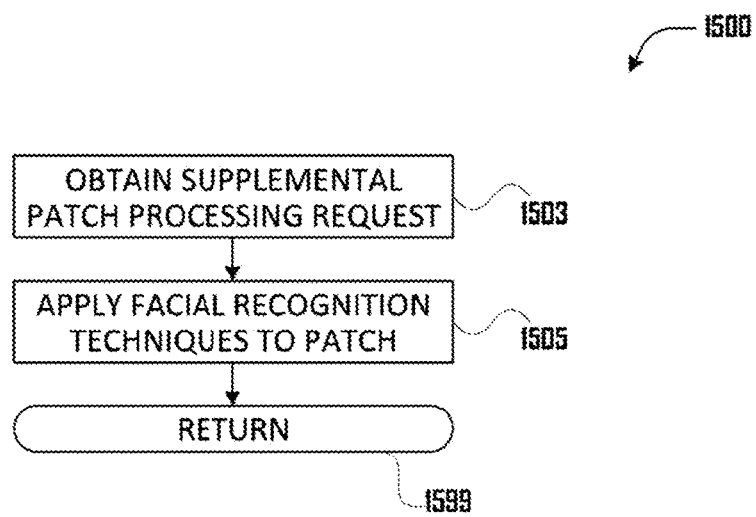
FIG. 15 illustrates a logic flow diagram of an exemplary object recognition sub-routine in accordance with at least one embodiment.

FIGS. 14 and 15 respectively illustrate an exemplary object recognition patch selection sub-routine 1400 and an exemplary object recognition sub-routine 1500, suitable for use with various aspects of the present methods and systems. For example, object recognition patch selection sub-routine 1400 and object recognition sub-routine 1500 may be called by a video preprocessing sub-routine, such as video pre-processing sub-routine 1100, described above, and be implemented by the hardware of a video capture/encoding device, such as exemplary video capture/encoding device 300, in order to enable the functionality of video pre-processing module 405. For example, dynamic viewport patch selection sub-routine 1200 and high-resolution encoding sub-routine 1300 may be useful for implementing dynamic object tagging during video streaming from a video capture/encoding device.

Referring first to FIG. 14, object recognition patch selection sub-routine 1400 may obtain a supplemental processing patch selection request at execution block 1403.

Object recognition patch selection sub-routine 1400 may scan the identified patch for one or more predefined objects at execution block 1405. For example, object recognition patch selection sub-routine 1400 may apply facial recognition techniques to determine whether one or more facial structures may be captured in the identified patch.

At decision block 1408, if the identified patch does contain one or more predefined objects, then object recognition patch selection sub-routine 1400 may return a true value at return block 1498; otherwise object recognition patch selection sub-routine 1400 may return a false value return block 1499.

Referring now to FIG. 15, object recognition sub-routine 1500 may obtain an object recognition request at execution block 1503.

Object recognition sub-routine 1500 may apply one or more object recognition techniques to the identified patch at execution block 1505.

Object recognition sub-routine 1500 may end at return block 1599.

Exemplary Video Rendering Routine

FIG. 16 illustrates an exemplary video rendering routine 1600 suitable for use with various aspects of the present methods and systems in order to render a video sequence from a multi-layer video transport stream, as is described above. For example, video rendering routine 1600 may be implemented by the hardware of a video decoding/rendering device, such as exemplary video decoding/rendering device 600, in order to enable the functionality of a video rendering application and/or a video decoding module with multi-layer transport stream capabilities, such as exemplary video decoding module 700.

In the illustrated embodiment, the multi-layer transport stream obtained by video decoding module 700 may correspond to a video sequence having a relatively large viewable area, such as a wide-frame video sequence, while the rendering request may be associated with a relatively smaller rendering viewport within the viewable area (see, e.g., video frame 500 and initial default viewport 528 describe above with reference to FIG. 5B). In such an embodiment, the multi-layer transport stream may include base layer data corresponding to video frames of the relatively large viewable area encoded at a first resolution and supplemental layer data corresponding to one or more patches of each video frame encoded at a second resolution.

Video rendering routine 1600 may obtain a rendering request associated with a video sequence corresponding to a multilayer transport stream at execution block 1603.

Video rendering routine 1600 may scan a decoded video buffer for decoded image data associated with the video sequence at execution block 1605. For example, video rendering routine 1600 may determine whether the decoded video buffer includes decoded base layer and supplemental layer data corresponding to a predefined minimum number of frames of the video sequence, i.e. to avoid buffering delays or "lag" while rendering the video sequence.

At decision block 1608, if the decoded video buffer has a minimum buffer fullness level, then video rendering routine 1600 may proceed to starting block 1610; otherwise video rendering routine 1600 may continue to wait for decoded video buffer reach the minimum buffer fullness level.

At starting loop block 1610, video rendering routine 1600 may process each frame of the video sequence in turn.

Video rendering routine 1600 may call a rendering control sub-routine 1700, described below with reference to FIG. 17.

At ending loop block 1613, video rendering routine 1600 may loop back to starting loop block 1610 to process the next frame of the video sequence, if any.

Video rendering routine 1600 may end at return block 1699.

Exemplary Rendering Control Sub-Routine

Figure 17:
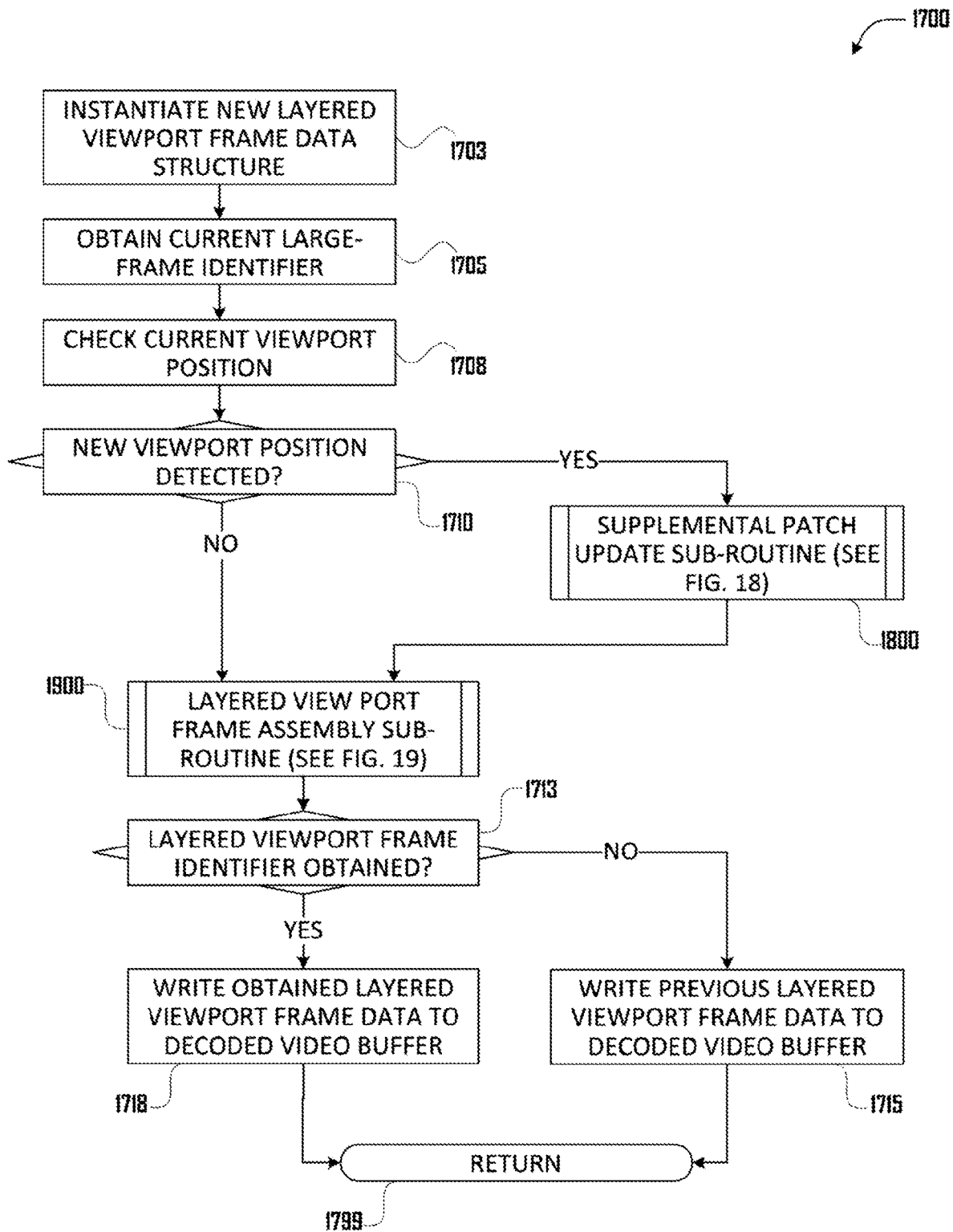
FIG. 17 illustrates a logic flow diagram of an exemplary rendering control sub-routine in accordance with at least one embodiment.

FIG. 17 illustrates an exemplary rendering control sub-routine 1700 suitable for use with various aspects of the present methods and systems. Referring to FIG. 7 for example, rendering control sub-routine 1700 may be called by a rendering routine such as video rendering routine 1600 described above, and may be implemented by the hardware of a video decoding/rendering device, such as exemplary video decoding/rendering device 600, in order to enable the functionality of video post processing module 705 of video decoding module 700.

Rendering control sub-routine 1700 may instantiate a new layered to viewport frame data structure at execution block 1703.

Rendering control sub-routine 1700 may obtain a current frame identifier at execution block 1705.

Rendering control sub-routine 1700 may determine a current viewport position at execution block 1708.

At decision block 1710, if a new view port position is detected, then rendering control sub-routine 1700 may proceed to call a supplemental patch update sub-routine 1800, described below with reference to FIG. 18; otherwise rendering control sub-routine 1700 may call a layered viewport frame assembly sub-routine 1900, described below with reference to FIG. 19.

As is described below, layered viewport frame assembly sub-routine 1900 may return a layered viewport image data structure identifier or may return an error message. At decision block 1713, if a layered viewport frame identifier is obtained from layered viewport frame assembly sub-routine 1900, then rendering control sub-routine 1700 may proceed to execution block 1715; otherwise rendering control sub-routine 1700 may proceed to execution block 1718.

Rendering control sub-routine 1700 may write data corresponding to the identified layered viewport frame to the decoded video buffer at execution block 1715.

Rendering control sub-routine 1700 may write data corresponding to a previous layered viewport frame to the decoded video buffer at execution block 1718.

Rendering control sub-routine 1700 may end at return block 1799.

Exemplary Supplemental Patch Update Sub-routine

Figure 18:
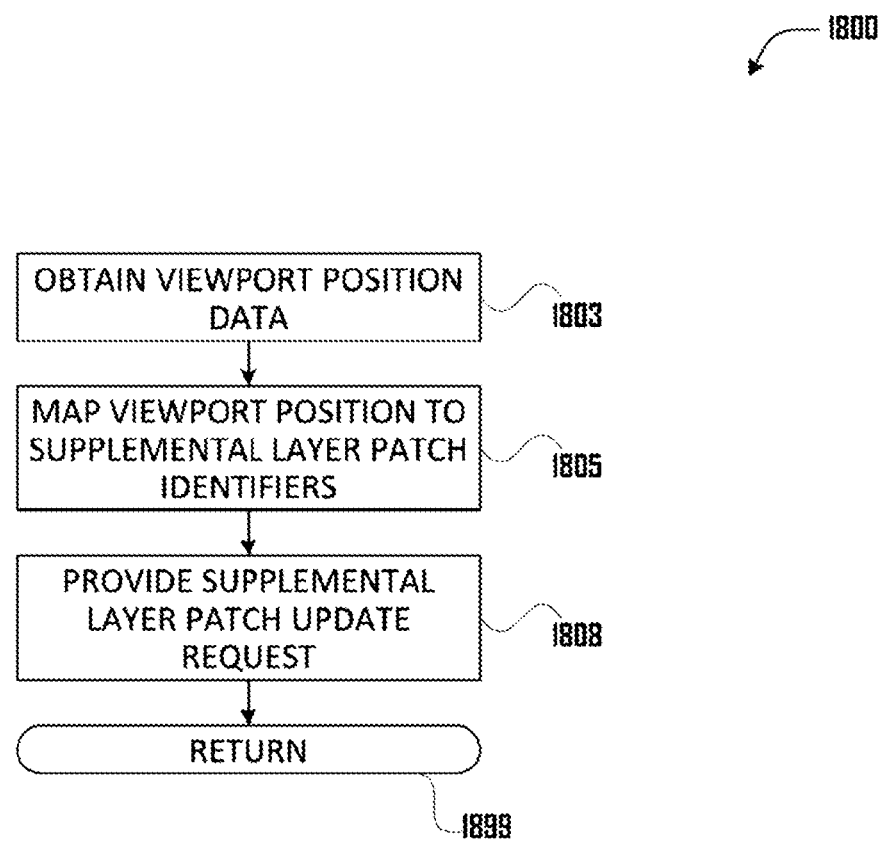
FIG. 18 illustrates a logic flow diagram of an exemplary supplemental patch update sub-routine in accordance with at least one embodiment.

FIG. 18 illustrates an exemplary supplemental patch update sub-routine 1800 suitable for use with various aspects of the present methods and systems. For example, supplemental patch update sub-routine 1800 may be called by rendering control sub-routine 1700, and may be implemented by the hardware of a video decoding/rendering device, such as exemplary video decoding/rendering device 600, in order to enable the functionality of a video postprocessing module.

Supplemental patch update sub-routine 1800 may obtain viewport positioning data at execution block 1803.

Supplemental patch update sub-routine 1800 may map the obtained viewport positioning data to one or more supplemental layer patch identifiers at execution block 1805.

Supplemental patch update sub-routine 1800 may provide a supplemental layer patch update request at execution block 1808.

Supplemental patch update sub-routine 1800 may end at return block 1899.

Exemplary Layered Viewport Frame Assembly Sub-Routine

Figure 19:
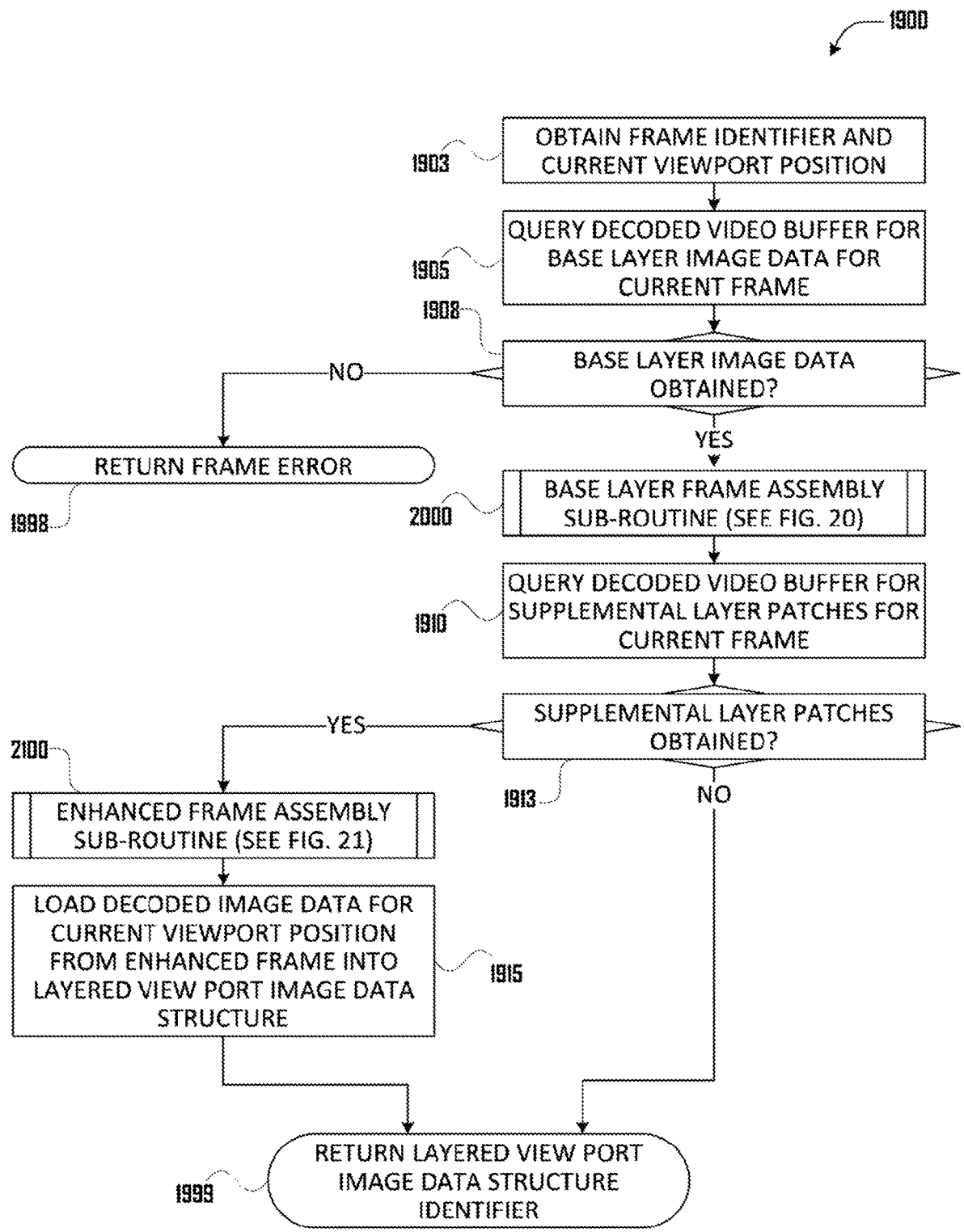
FIG. 19 illustrates a logic flow diagram of an exemplary layered viewport frame assembly sub-routine in accordance with at least one embodiment.

FIG. 19 illustrates an exemplary layered viewport frame assembly sub-routine 1900 suitable for use with various aspects of the present methods and systems. For example, layered viewport frame assembly sub-routine 1900 may be called by rendering control sub-routine 1700, and may be implemented by the hardware of a video decoding/rendering device, such as exemplary video decoding/rendering device 600, in order to enable the functionality of a video postprocessing module.

Layered viewport frame assembly sub-routine 1900 may obtain a frame identifier and a current viewport position at execution block 1903.

Layered viewport frame assembly sub-routine 1900 may query the decoded video buffer for base layer image data associated with the current frame at execution block 1905.

At decision block 1908, if base layer data is obtained from the decoded video buffer, then layered viewport frame assembly sub-routine 1900 may call a base layer frame assembly sub-routine 2000, described below with reference to FIG. 20; otherwise layered viewport frame assembly sub-routine 1900 may end by returning a frame error message at return block 1998.

After calling base layer frame assembly sub-routine 2000, layered viewport frame assembly sub-routine 1900 may query the decoded video buffer for supplemental layer patch data associated with the current frame at execution block 1910.

At decision block 1913, if supplemental layer data is obtained from the decoded video buffer, then layered viewport frame assembly sub-routine 1900 may call an enhanced frame assembly sub-routine 2100, described below with reference to FIG. 21; otherwise layered viewport frame assembly sub-routine 1900 may proceed to return block 1999.

After calling enhanced frame assembly sub-routine 2100, layered viewport frame assembly sub-routine 1900 may load decoded image data for the current viewport position into the layered viewport image data structure.

Layered viewport frame assembly sub-routine 1900 may end by returning an identifier associated with the layered viewport image data structure at return block 1999.

Exemplary Base Layer Frame Assembly Sub-Routine

Figure 20:
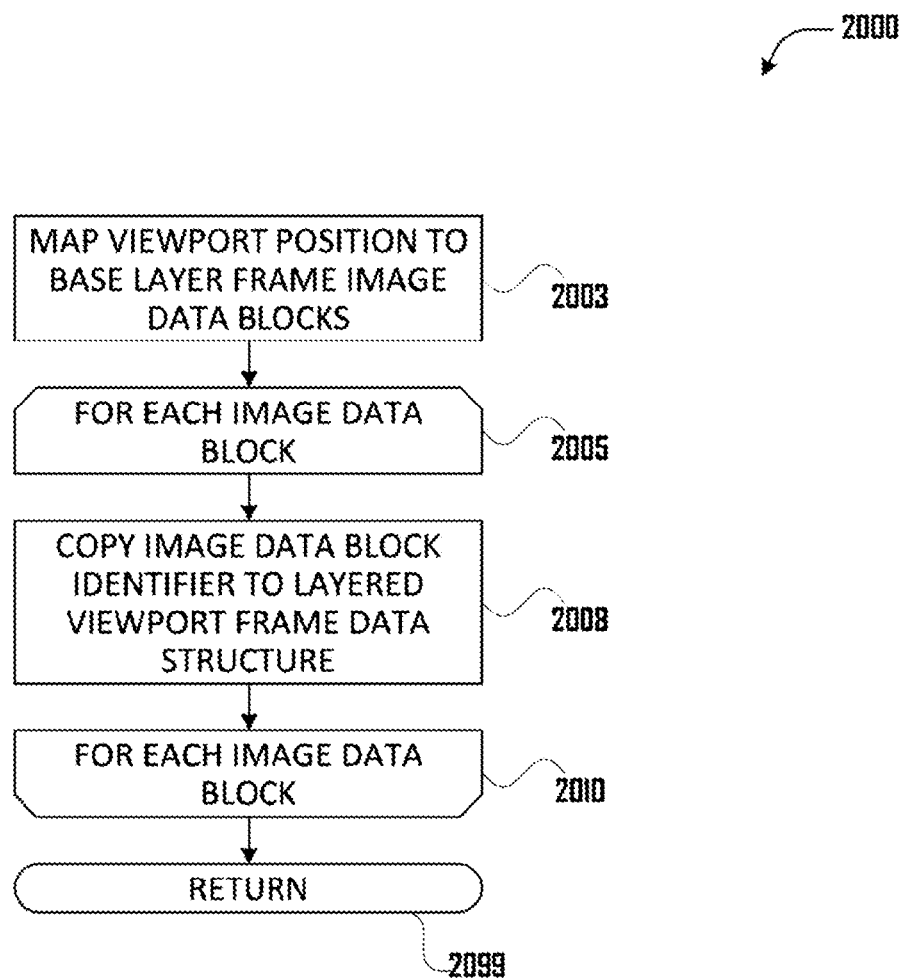
FIG. 20 illustrates a logic flow diagram of an exemplary base layer frame assembly sub-routine in accordance with at least one embodiment.

FIG. 20 illustrates an exemplary base layer frame assembly sub-routine 2000 suitable for use with various aspects of the present methods and systems. For example, base layer frame assembly sub-routine 2000 may be called by layered viewport frame assembly sub-routine 1900, and may be implemented by the hardware of a video decoding/rendering device, such as exemplary video decoding/rendering device 600, in order to enable the functionality of a video postprocessing module . . . .

Base layer frame assembly sub-routine 2000 may map the current viewport position to base layer image data blocks of the current frame at execution block 2003.

At starting loop block 2005, base layer frame assembly sub-routine 2000 may process each base layer image data block in turn.

Base layer frame assembly sub-routine 2000 may copy an identifier corresponding to the current base layer image data block to the layered viewport frame data structure at execution block 2008.

At ending loop block 2010, base layer frame assembly sub-routine 2000 may loop back to starting block 2005 and process the next base layer image data block, if any.

Base layer frame assembly sub-routine 2000 may end at return block 2099.

Exemplary Enhanced Frame Assembly Sub-Routine

Figure 21:
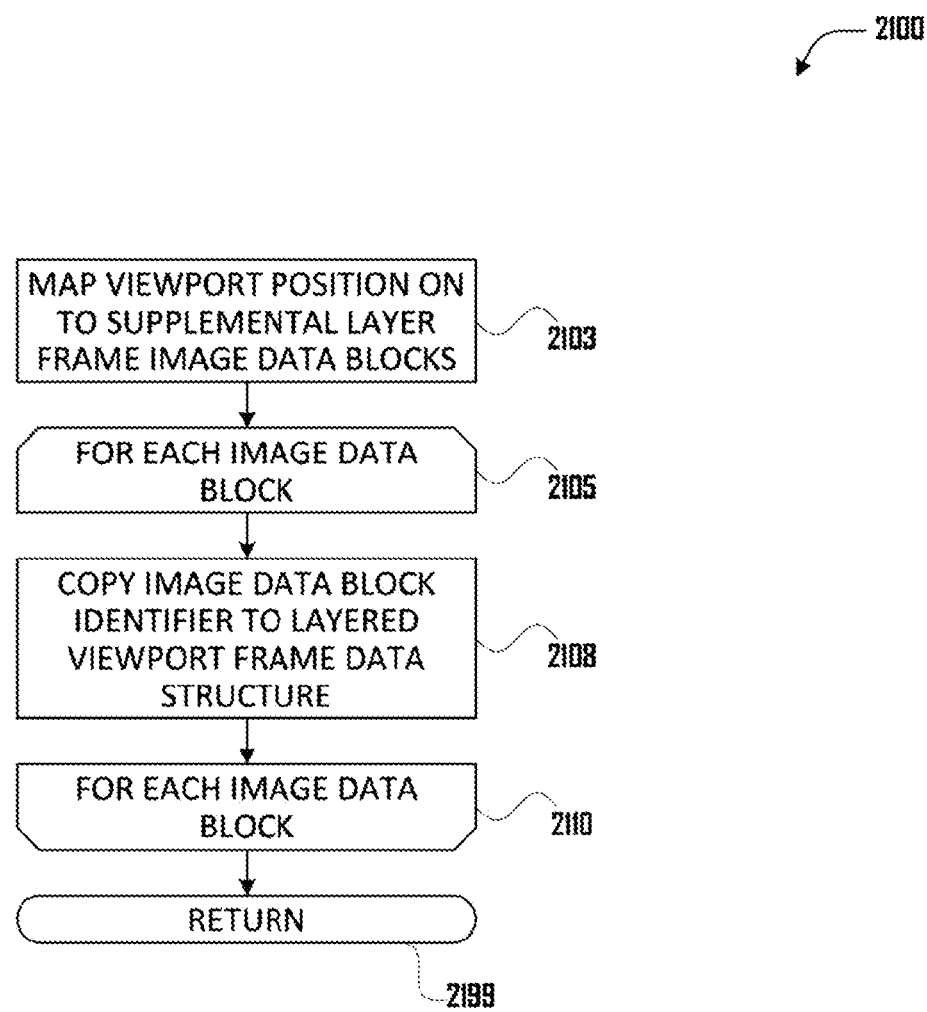
FIG. 21 illustrates a logic flow diagram of an enhanced frame assembly sub-routine in accordance with at least one embodiment.

FIG. 21 illustrates an exemplary enhanced frame assembly sub-routine 2100 suitable for use with various aspects of the present methods and systems. For example, enhanced frame assembly sub-routine 2100 may be called by layered viewport frame assembly sub-routine 1900, and may be implemented by the hardware of a video decoding/rendering device, such as exemplary video decoding/rendering device 600, in order to enable the functionality of a video postprocessing module.

Enhanced frame assembly sub-routine 2100 may map the current viewport position to supplemental layer image data blocks at execution block 2103.

At starting loop block 2105, enhanced frame assembly sub-routine 2100 may process each supplemental layer image data block in turn.

Enhanced frame assembly sub-routine 2100 may copy an identifier corresponding to the current supplemental layer image data block to the layered viewport frame data structure at execution block 2108. This process may overwrite one or more base layer image data block identifiers with corresponding supplemental layer image data block identifiers.

At ending loop block 2110, enhanced frame assembly sub-routine 2100 may loop back to starting loop block 2105 to process the next supplemental layer image data block if any.

Enhanced frame assembly sub-routine 2100 may end at return block 2199.

Video Encoder

Figure 22:
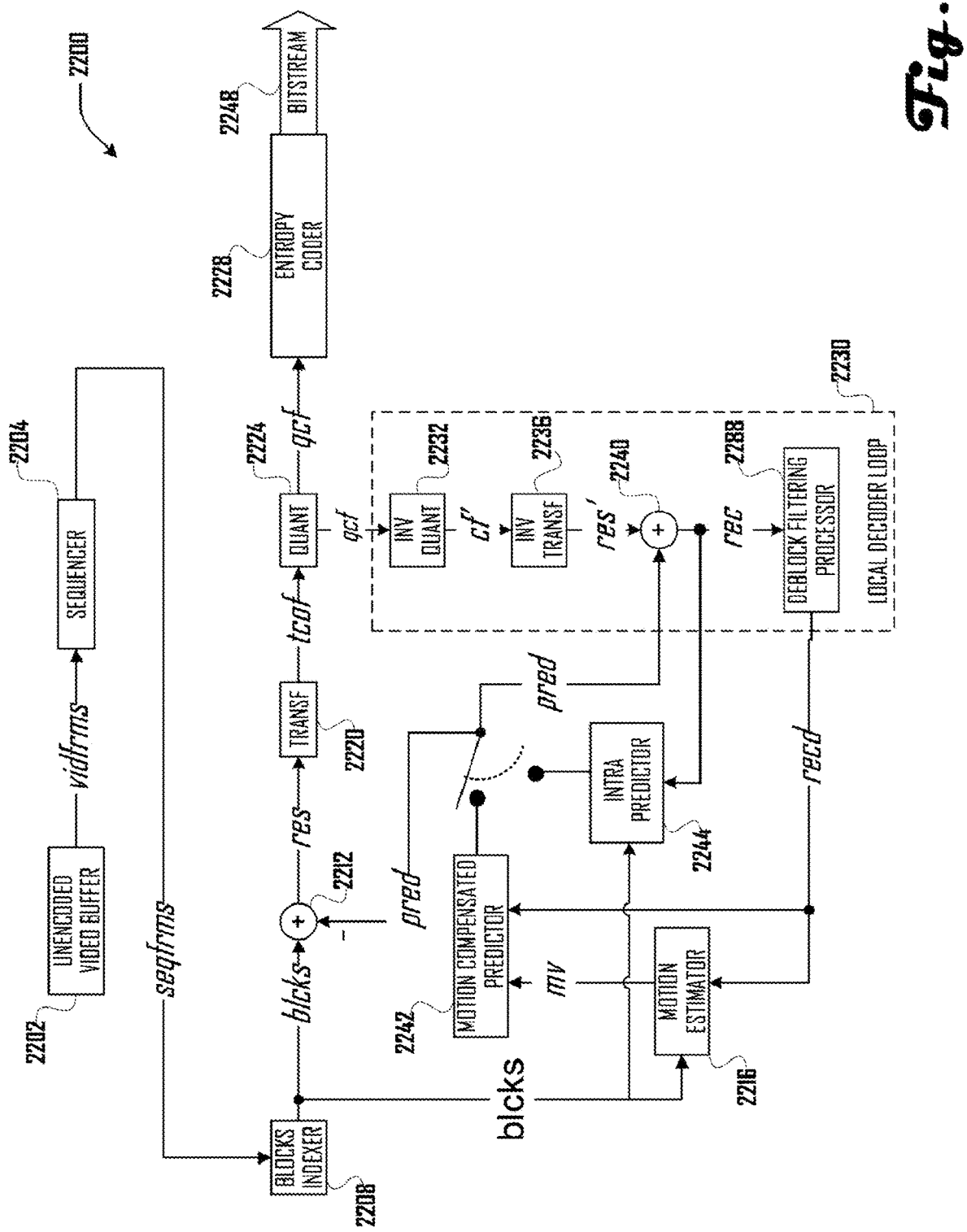
FIG. 22 illustrates an exemplary video encoding routine in accordance with at least one embodiment.

FIG. 22 shows a general functional block diagram of an exemplary software implemented video encoder 2200 (hereafter "encoder") suitable for use with various embodiments of the present methods and systems. Other types of video encoders may also be suitable for use with the present methods and systems.

One or more unencoded video frames (vidfrms) of a video sequence may be stored in an unencoded video buffer 2202, indexed in display order.

A sequencer 2204 may assign a predictive-coding picture-type (e.g. I, P, or B) to each unencoded video frame and reorder the sequence of frames, or groups of frames from the sequence of frames, into a coding order for motion prediction purposes (e.g. I-type frames followed by P-type frames, followed by B-type frames). The sequenced unencoded video frames (seqfrms) may then be obtained, in coding order, by blocks indexer.

For each of the sequenced unencoded video frames (seqfrms), blocks indexer 2208 may divide the unencoded frame into an array of coding blocks (blcks). Individual coding blocks within a given frame may vary in size, e.g. from four by four pixels up to one hundred and twenty-eight by one hundred and twenty-eight pixels.

Each coding block may then be input to difference 2212 and may be differenced with corresponding prediction signal blocks (pred) generated from previously encoded coding blocks. To generate the prediction blocks (pred), coding blocks (blcks) may also be provided to an intra-predictor 2244 and a motion estimator 2216. After differencing at difference 2212, a resulting residual block (res) may be forward-transformed to a frequency-domain representation by transformer 2220, resulting in a block of transform coefficients (tcoj). The block of transform coefficients (tcoj) may then be sent to quantizer 2224 resulting in a block of quantized coefficients (qcj) that may then be sent both to an entropy coder 2228 and to a local decoding loop 2230.

For intra-coded coding blocks, intra-predictor 2244 provides a prediction signal representing a previously coded area of the same frame as the current coding block. For an inter-coded coding block, motion compensated predictor 2242 provides a prediction signal representing a previously coded area of a different frame from the current coding block.

At the beginning of the local decoder loop, inverse quantizer may de-quantize the block of transform coefficients (cf) and pass them to inverse transformer to generate a de-quantized residual block (res'). At adder, a prediction block (pred) from motion compensated predictor or intra-predictor may be added to the de-quantized residual block (res') to generate a locally decoded block (rec). Locally decoded block (rec) may then be sent to a frame-assembler-and deblock-filtering processor 2288, which reduces blockiness and assembles a recovered frame (recd), which may be used as the reference frame for motion estimator and motion compensated predictor.

Entropy coder 2228 encodes the quantized transform coefficients (qcj, differential motion vectors (dmv), and other data, generating an encoded video bit-stream. For each frame of the unencoded video sequence, encoded video bit-stream may include encoded picture data (e.g. the encoded quantized transform coefficients (qcf) and differential motion vectors (dmv)) and an encoded frame header (e.g. syntax information such as the LCB size for the current frame).

Exemplary Decoder

FIG. 23 shows a general functional block diagram of a corresponding software implemented interframe video decoder 2300 (hereafter "decoder") being suitable for use with the present methods and systems. Other types of video decoders may also be suitable for use with the present methods and systems.

Decoder 2300 may work similarly to the local decoder loop 2230 of the encoder 2200. Specifically, an encoded video bit-stream 2304 to be decoded may be provided to an entropy decoder 2308, which may decode blocks of quantized coefficients (qcf), differential motion vectors (dmv), accompanying message data packets (not shown), and other data, including the prediction mode signal (intra or inter). The quantized coefficient blocks (qcf) may then be reorganized by an inverse quantizer 2312, resulting in recovered transform coefficient blocks (cf). Recovered transform coefficient blocks (cf) may then be inverse transformed out of the frequency-domain by an inverse transformer 2316, resulting in decoded residual blocks (res'). An adder 2320 may add motion compensated prediction blocks (psb) obtained by using corresponding motion vectors (dmv) from a motion compensated predictor 2330. The resulting decoded video (dv) may be deblock-filtered in a frame-assembler-and-deblock-filtering-processor 2324. Blocks (recd) at the output of frame-assembler-and-deblock-filtering-processor 2324 form a reconstructed frame of the video sequence, which may be output from the decoder, e.g. to a decoded video buffer, and also may be used as the reference frame for motion-compensated predictor 2320 for decoding subsequent coding blocks.

FIG. 24 illustrates a schematic diagram 2400 of an implementation that provides a scalable multi-layer video transport stream to client devices 2402 dependent on network connectivity quality or other metrics. An encoding/source device may partition a video into a plurality of layers, including a base layer and one or more enhancement layers. The base layer provides a representation of the video at a first quality level, and the one or more enhancement layers are combinable with the base layer (and one or more lower quality enhancement layers) to provide enhanced quality representations of the video. Thus, rather than switching streams of varying quality based on network connection, a source device can provide a scalable stream that includes one or more layers depending on the currently available network connection. In the example shown in FIG. 24, a video may be partitioned into a low quality base layer 2404, a mid-quality first enhancement layer 2406, and a high quality enhancement layer 2408. The mid-quality enhancement layer 2406 may be combinable (as indicated by a combiner element 2414) with the lower quality base layer 2406 to provide a mid-quality representation of a video. Similarly, the high-quality enhancement layer 2406 may be combinable via the combiner element 2414 with both the mid-quality enhancement layer 2406 and the lower quality base layer 2406 to provide a high-quality representation of a video.

The quality levels may be metrics associated with one or more of spatial resolution (e.g., frame size), temporal resolution (e.g., frame rate), signal-to-noise ratio (e.g., different quantization levels), or any other quality metric. In the example shown, the layers 2404, 2406, and 2408 are used to provide spatial scalability. For example, a stream that includes only the low quality base layer 2404 provides 1080p video, a stream that includes the low quality base layer 2404 and the mid-quality first enhancement layer 2406 provides 4K video, and a stream that includes the low quality base layer 2404, the mid quality enhancement layer 2406, and the high quality enhancement layer 2408 provides 8K video.

In operation, the client device 2402 may provide connection quality data feedback to the source device that indicates the number of layers of the video stream the client device can currently handle. This feedback data may be dynamically updated during streaming of the video as network conditions change (e.g., from one network technology to another network technology).

In the example shown in FIG. 24, when the client device 2402 is connected to a fourth generation wireless system (4G) 2412, the client device receives only the low quality base layer 2404. When the client device 2402 is connected to a fifth generation wireless system (5G) 2410, the client device receives either the low quality base layer 2404 and the mid-quality enhancement layer 2406, or all three layers 2404, 2406 and 2408. Thus, the client device 2402 is able to dynamically receive the best quality video dependent on the real-time connection between the client device and a source device. The source device may be one or more peer devices, a content delivery network (CDN), or any other video source device.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. Provisional Patent Application Ser. No. 62/492,858, filed May 1, 2017, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of encoding a video frame of a sequence of video frames to generate a multi-layer transport stream representative of the video frame, the video frame including an array of pixels and the multi-layer transport stream representative of the video frame, the method comprising:
dividing the video frame along a plurality of horizontal and vertical axes, thereby defining a plurality of patches, including a first row of patches above a transverse horizontal axis of the video frame, a second row of patches above the first row, a third row of patches below the transverse horizontal axis, and a fourth row of patches below the third row, wherein each corresponding patch in the first row has a first height, each corresponding patch in the second row has a second height that is greater than the first height, each corresponding patch in the third row has a third height, and each corresponding patch in the fourth row has a fourth height that is greater than the third height;
selecting one or more of the plurality of patches for supplemental processing;
generating encoded frame data corresponding to the video frame, the encoded frame data being generated at a first resolution;
generating encoded patch data corresponding to the selected one or more of the plurality of patches, the encoded patch data being generated at a second resolution that is higher than the first resolution;
generating a base layer of the multi-layer transport stream, the base layer including the encoded frame data; and
generating a supplemental layer of the multi-layer transport stream, the supplemental layer including the encoded patch data.

2. The method of claim 1, further comprising:
receiving feedback data from a video rendering device over a communications network, the feedback data corresponding to a spatial portion of the video frame, wherein selecting one or more of the plurality of patches for supplemental processing comprises selecting one or more of the plurality of patches for supplemental processing based at least in part on the received feedback data from the video rendering device.

3. The method of claim 2 wherein receiving feedback data from a video rendering device comprises receiving dynamic feedback data from the video rendering device during rendering of the sequence of video frames by the video rendering device.

4. The method of claim 2 wherein receiving feedback data from a video rendering device comprises receiving feedback data generated by the video rendering device responsive to movement of the video rendering device by a user thereof.

5. The method of claim 1 wherein receiving feedback data from a video rendering device comprises receiving feedback data generated by the video rendering device responsive to user interaction with a user interface operatively coupled to the video rendering device.

6. The method of claim 1, further comprising:
detecting one or more objects in the video frame,
wherein selecting one or more of the plurality of patches for supplemental processing comprises selecting one or more of the plurality of patches for supplemental processing based at least in part on spatial location of the detected one or more objects.

7. The method of claim 6 wherein detecting one or more objects in the video frame comprises applying a facial recognition technique to determine whether one or more facial structures may be captured in the video frame.

8. The method of claim 1 wherein the transverse horizontal axis is a central horizontal axis in the video frame.

9. The method of claim 1 wherein the first row is adjacent to the transverse horizontal axis, the second row is adjacent to a top of the video frame, the third row is adjacent to the transverse horizontal axis, and the fourth row is adjacent to a bottom of the video frame.

10. The method of claim 1 wherein the first row is adjacent to the transverse horizontal axis, the second row is adjacent to the first row, the third row is adjacent to the transverse horizontal axis, and the fourth row is adjacent to the third row.

11. A method of providing and rendering video content, the method comprising:
dividing a video frame along a plurality of horizontal and vertical axes, thereby defining a plurality of patches, wherein patches at a first vertical distance from a select horizontal axis in the video frame have a first height and patches at a second vertical distance from the select horizontal axis have a second height that is greater than the first height, and wherein the second vertical distance is greater than the first vertical distance;
generating, by a video source device, encoded frame data corresponding to a video frame, the encoded video data being generated at a first resolution;
generating, by the video source device, encoded patch data corresponding to an initial viewport of an initial selection of patches in the video frame, the encoded patch data being generated at a second resolution that is higher than the first resolution;
generating, by the video source device, a base layer of a multi-layer transport stream, the base layer including the encoded frame data; and
generating, by the video source device, a supplemental layer of the multi-layer transport stream, the supplemental layer including the encoded patch data;
providing, by the video source device, the multi-layer transport stream to a video rendering device over a communications network;
rendering, by the video rendering device, the initial viewport using the received data from the supplemental layer of the multi-layer transport stream;

receiving, by the video rendering device, an indication of a desire to change the viewport from the initial viewport to a new viewport;

rendering, by the video rendering device, the new viewport using data from the base layer;

providing, by the video rendering device, feedback data to the video source device indicating the new viewport;

responsive to receiving the feedback data, generating, by the video source device, encoded patch data corresponding to the new viewport of the video frame;

determining, by the video rendering device, that the supplemental layer data of the multi-layer transport stream corresponds to the new viewport; and rendering, by the video rendering device, the new viewport using data from the supplemental layer.

12. The method of claim 11, further comprising:

iteratively during streaming of the multi-layer transport stream:

rendering, by the video rendering device, a current viewport using the received data from the supplemental layer of the multi-layer transport stream;

receiving, by the video rendering device, an indication of a desire to change the viewport from the current viewport to a new viewport;

rendering, by the video rendering device, the new viewport using data from the base layer;

providing, by the video rendering device, feedback data to the video source device indicating the new viewport;

responsive to receiving the feedback data, generating, by the video source device, encoded patch data corresponding to the new viewport of the video frame;

determining, by the video rendering device, that the supplemental layer data of the multi-layer transport stream corresponds to the new viewport; and rendering, by the video rendering device, the new viewport using data from the supplemental layer.

13. A method of encoding a video to generate a scalable video transport stream, the method comprising:

partitioning the video into a plurality of layers, the plurality of layers comprising at least a base layer and a first enhancement layer;

generating encoded base frame data corresponding to the base layer of the video, the encoded base frame data comprises a representation of the video at a first quality level;

dividing the video frame along a plurality of horizontal and vertical axes, thereby defining a plurality of patches, wherein a size of each corresponding patch of the plurality of patches increases as a function of the corresponding patch's vertical distance from a transverse horizontal axis of the video frame;

generating encoded first enhancement layer data corresponding to the first enhancement layer of the video, the encoded first enhancement layer data combinable with the encoded base layer data to provide a representation of the video at a second quality level that is higher than the first quality level;

receiving connection quality data; and responsive to the received connection quality data:

providing a video transport stream that comprises the base layer to a video client device; or providing a video transport stream that comprises both the base layer and the first enhancement layer to a video client device.

14. The method of claim 13 wherein the first quality level and the second quality level are quality metrics associated with at least one of temporal resolution, spatial resolution, or signal-to-noise ratio.

15. The method of claim 13 wherein partitioning the video into a plurality of layers comprises partitioning the video into at least a base layer, a first enhancement layer, and a second enhancement layer, the method further comprising:

generating encoded second enhancement layer data corresponding to the second enhancement layer of the video, the encoded second enhancement layer data combinable with the encoded first enhancement layer data and the encoded base layer data to provide a representation of the video at a third quality level that is higher than the second quality level; and responsive to the received connection quality data:

providing a video transport stream that comprises the base layer to a video client device; or providing a video transport stream that comprises both the base layer and the first enhancement layer to a video client device; or providing a video transport stream that comprises the base layer, the first enhancement layer, and the second enhancement layer to a video client device.

16. The method of claim 13 wherein receiving connection quality data comprises receiving an indication of a network technology currently used by the client device.

17. The method of claim 13 wherein the transverse horizontal axis is a central horizontal axis in the video frame.

18. The method of claim 13 wherein a first patch above and adjacent to the transverse horizontal axis has a first height and a second patch above the first patch has a second height that is greater than the first height.

19. The method of claim 13 wherein a first patch below and adjacent to the transverse horizontal axis has a first height and a second patch below the first patch has a second height that is greater than the first height.

20. The method of claim 13 wherein a first patch above and adjacent to the transverse horizontal axis has a first height and a second patch above the first patch and adjacent to a top of the video frame has a second height that is greater than the first height.

21. The method of claim 13 wherein a first patch below and adjacent to the transverse horizontal axis has a first height and a second patch below the first patch and adjacent to a bottom of the video frame has a second height that is greater than the first height.

* * * * *